United States Patent [19]

Bralich et al.

[11] Patent Number: 5,878,385
[45] Date of Patent: Mar. 2, 1999

[54] METHOD AND APPARATUS FOR UNIVERSAL PARSING OF LANGUAGE

[75] Inventors: Phillip A. Bralich, Honolulu, Hi.; Derek Bickerton, Talent, Oreg.

[73] Assignee: Ergo Linguistic Technologies

[21] Appl. No.: 715,313

[22] Filed: Sep. 16, 1996

[51] Int. Cl.$^6$ .................................................. G06F 17/27
[52] U.S. Cl. ................................... 704/9; 704/8; 704/10; 707/532
[58] Field of Search .............................. 704/9, 8, 10, 1; 707/531, 532, 536, 533, 534

[56] References Cited

U.S. PATENT DOCUMENTS

| | | | |
|---|---|---|---|
| 4,706,212 | 11/1987 | Toma | 704/2 |
| 4,829,423 | 5/1989 | Tennant et al. | 704/8 |
| 4,864,503 | 9/1989 | Tolin | 704/2 |
| 4,868,750 | 9/1989 | Kucera et al. | 704/8 |
| 4,887,212 | 12/1989 | Zamora et al. | 704/8 |
| 4,984,178 | 1/1991 | Hemphill et al. | 704/255 |
| 4,994,966 | 2/1991 | Hutchins | 704/9 |
| 5,091,950 | 2/1992 | Ahmed | 704/277 |
| 5,109,509 | 4/1992 | Katayama et al. | 704/9 |
| 5,128,865 | 7/1992 | Sadler | 704/2 |
| 5,157,606 | 10/1992 | Nagashima | 704/2 |
| 5,222,187 | 6/1993 | Doddington et al. | 704/200 |
| 5,287,429 | 2/1994 | Watanabe | 704/239 |
| 5,297,040 | 3/1994 | Hu | 704/9 |
| 5,321,606 | 6/1994 | Kuruma et al. | 704/9 |
| 5,321,607 | 6/1994 | Fukumochi et al. | 704/4 |
| 5,355,493 | 10/1994 | Silberbauer et al. | 395/701 |
| 5,384,702 | 1/1995 | Tou | 704/9 |
| 5,416,696 | 5/1995 | Suzuoka | 704/2 |
| 5,424,947 | 6/1995 | Nagao et al. | 704/9 |
| 5,475,587 | 12/1995 | Anick et al. | 704/9 |
| 5,687,384 | 11/1997 | Nagese | 704/9 |
| 5,721,938 | 2/1998 | Stuckey | 704/4 |

FOREIGN PATENT DOCUMENTS 2 211 639  7/1989  United Kingdom .

OTHER PUBLICATIONS

Aho, A.V. et al., *Compilers: Principles, Techniques, and Tools*, Sections 2.4, 4.4–4.5, 4.7, 5.3, 5.6, 6.7 (Addison–Wesley Publishing Company 1986).

Allen, J., *Natural Language Understanding*, Chapters 3–6, 17 (The Benjamin/Cummings Publishing Company, Inc. 1995).

Bralich, P., and D. Bickerton, "A Proposal for the Revision of the theory of P and P Syntax," (seminar presentation material 1992).

Bralich, P., and D. Bickerton, "Anaphoric Reference," (seminar presentation material 1992).

Bralich, P., and D. Bickerton, "Attach α," (seminar presentation material 1992).

Bralich, P., and D. Bickerton, "Other Syntactic Phenomena," (seminar presentation material 1992).

Cohen, R., "Analyzing the Structure of Argumentative Discourse," *Computational Linguistics*, 13(1–2):11–24 (1987).

Grosz, B.J. et al., "TEAM: An Experiment in the Design of Transportable Natural–Language Interfaces," *Artificial Intelligence*, 32(2):173–243 (1987).

(List continued on next page.)

*Primary Examiner*—Joseph Thomas

[57] ABSTRACT

A method and apparatus for natural language parsing are described. The invention includes the steps of retrieving an input string, and performing a dictionary look-up for each word in the input string to form a correspondence between each word and a dictionary entry. The dictionary entry provides lexical features of the word. The invention includes the additional step of processing the words in the input string beginning with a last word in the input string and continuing toward the first word in the input string. This step includes the step of associating a selected word in the input string with a word located to the left of the selected word in the input string to form a word phrase. The associating step is performed according to predetermined selection restriction rules. The steps of processing the words and associating a selected word are repeated until all words of the input string have been processed.

3 Claims, 12 Drawing Sheets

OTHER PUBLICATIONS

Grosz, B.J., "The Representation and Use of Focus in a System for Understanding Dialogs," *Readings in Natural Language Processing*, pp. 353–362 (Morgan Kaufmann Publishers, Inc. 1986).

Grosz, B.J., and C. Sidner, "Attention, Intentions, and the Structure of Discourse," *Computational Linguistics*, 12(3):175–204 (1986).

Hirschberg, J., and D.J. Litman, "Empirical Studies on the Disambiguation of Cue Phrases," *Computational Linguistics*, 19(3):501–530 (1993).

Kaplan, R.M., "A General Syntactic Processor" *Natural Language Processing*, Courant Computer Science Symposium 8: Dec. 20–21, 1971, pp. 193–241 (New York: Algorithmics Press, Inc., R. Rustin ed. 1973).

Kay, M., "Algorithm Schemata and Data Structures in Syntactic Processing," *Readings in Natural Language Processing*, pp. 35–70 (Morgan Kaufmann Publishers, Inc. 1986).

Kay, M., "The MIND System," *Natural Language Processing*, Courant Computer Science Symposium 8:Dec. 20–21, 1971, pp. 155–188 (New York: Algorithmics Press, Inc., R. Rustin ed. 1973).

Litman, D.J., and J.F. Allen, "A Plan Recognition Model for Subdialogues in Conversations," *Cognitive Science*, 11(2): 163–200 (1987).

Reichman, R., "Conversational Coherency," *Cognitive Science*, 2(4):283–327 (1978).

Reichman, R., *Getting Computers to Talk Like You and Me*, Chapters 2, 5 and 8 (Cambridge, MA: The MIT Press 1985).

Sidner, C.L., "Focusing in the Comprehension of Definite Anaphora," *Readings in Natural Language Processing*, pp. 363–394 (Morgan Kaufmann Publishers, Inc. 1986).

Sidner, C.L., "Plan Parsing for Intended Response Recognition in Discourse," *Computational Intelligence*, 1(1):1–10 (1985).

SPLITS
A SPLIT IS WHEN WE TAKE A SNAPSHOT OF THE CURRENT
SENTENCE STRUCTURE WE'RE WORKING ON
AND ALTER IT TO TRY ANOTHER POSSIBILITY
MAIN SEQUENCE 1 SPLIT
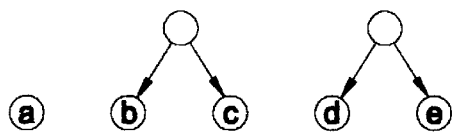
*Fig. 6A*
*Fig. 6B*
MAIN SEQUENCE 2 SPLIT
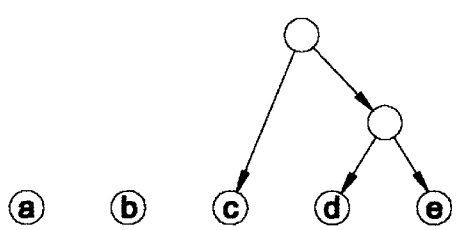
*Fig. 6C*
*Fig. 6D*

EVALUATION SUBROUTINES
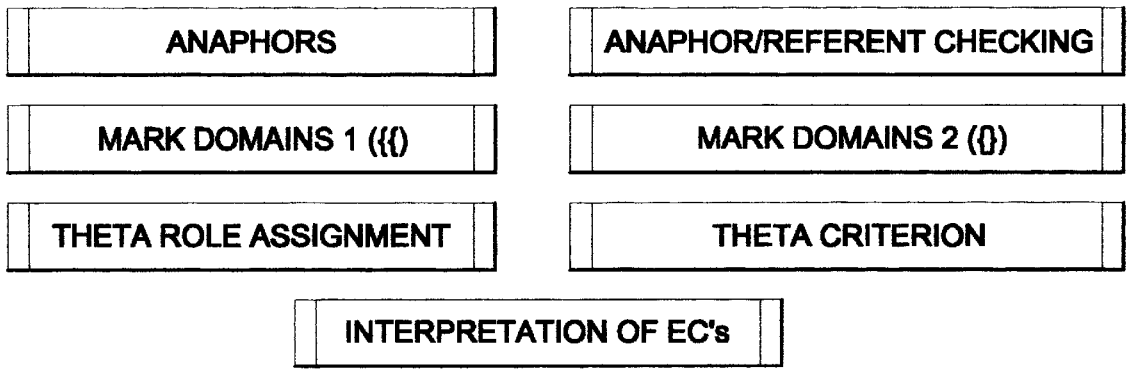
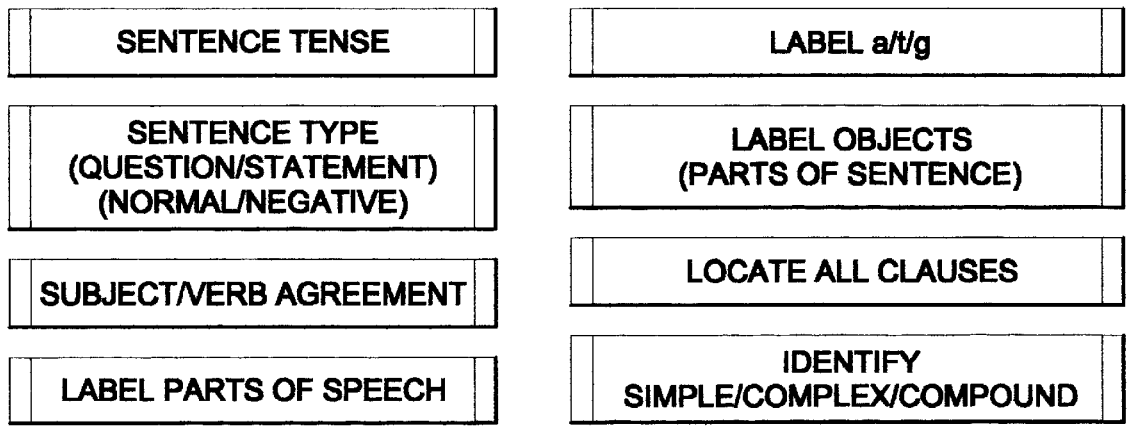
Fig. 11

METHOD AND APPARATUS FOR UNIVERSAL PARSING OF LANGUAGE

BACKGROUND OF THE INVENTION

The present invention relates generally to language parsers and more specifically to a method and apparatus for natural language parsing of sentences in real time that is universally applicable to other languages and is capable of analyzing the full range of grammar and syntax, manipulating sentences to create other structures, and engaging in question/answer and statement/response repartee in real time.

Since Chomsky (*Syntactic Structures*. The Hague/Paris: Mouton, 1957), linguists have been grappling with the problem of providing a generative theory of syntax to describe the structure of human language. This endeavor has resulted in a proliferation of syntactic theories, each with a slightly different set of assumptions about the correct characterization of syntax. Such known methods are described in publications such as *Government and Binding*, Chomsky (1981, 1986), *Lexical Functional Grammar*, Bresnan (1982) and Kaplan and Bresnan (1982), *Categorial Grammar*, Oehrle, Bach, and Wheeler (1988), *Lexicase* of Starosta (1988), *Generalized Phrase Structure Grammar*, Gazdar, Klein, Pullum, and Sag (1985), and *Head-driven Phrase Structure Grammar*, Pollard (1984, 1985). (*Generalized phrase structure grammars, head grammars, and natural language*. Stanford University dissertation. "Phrase structure grammar without metarules." In J. Goldberg, S. Mackaye, and M. Wescoat eds., *Proceedings of WCCFL 4*. Stanford linguistics association, 246–261.)

However, no theory or method has emerged as a widely accepted formulation that strictly conforms to the requirements of an explicit, generative grammar, nor has any theory or method gained wide acceptance as a truly representative model of the human faculty of language. Furthermore, none of these theories or methods have resulted in framework that can be fully implemented in a computer programming language to produce a viable natural language parser.

In the 1960's Noam Chomsky (Aspects of the Theory of Syntax) argued that it was possible to arrive at a scientific description of human language that was based on empirical investigations and which was based on the same principles as the sciences of chemistry, botany and so on. To do this he proposed a theory of syntax based on the structure of English. He further argued that once one had determined the basic nature of the syntax of one language, it would be possible to apply that theory to the languages of the world and arrive at equally descriptive and scientifically falsifiable descriptions as with those of the original language. Of course, there would be language specific variations that would account for the differences we all perceive in the different languages of the world, but the underlying theory would be one of a "universal grammar" from which all other grammars were derived.

It was subsequently argued that the theories of syntax that were proposed by Chomsky and others could be implemented in a computer program to create a "parser," a grammar analysis device, thereby giving computers many (though not all) of the language abilities possessed by people. It is important to point out the meanings of the words "grammar" and "syntax" as used hereinafter. In some cases the words "grammar" and "syntax" overlap in that they both refer to the structural relationship of words and parts of words that result in phrases, clauses, and sentences. However, in general, "linguistics" refers to formal scientific descriptions of these structural relationships while "grammar" refers to the more ordinary English text book style description of these relationships.

Following Chomsky's lead, since the 1960's and continuing to the present, linguists and computer scientists at major universities and institutions around the world have been struggling to arrive at a theory of syntax that is both capable of fully describing the structures of a language and capable of being implemented in a programming language. To date, the success on both counts has been meager at best. There is currently no single parser or method and no theory of syntax that can adequately accomplish the task. In fact, in judging the known methods based on the actual parsers that have been developed, one can conclude that they are still in their infancy. Known parsers and methods can only handle the simplest sentences and are only applicable to a very small subset of the syntactic and grammatical functions that comprise even one language of the world. In spite of the millions of dollars and hundreds of thousands of man hours that have been spent to solve this problem, computers implementing such known methods can only respond to basic commands. Such grammar checkers and translation devices have only the most rudimentary grammatical abilities. The ability to perform question/answer and statement/response repartee with computers and computer applications is unattainable using known methods. The current inventive method and apparatus, interchangeably referred to as "Attach Alpha" (also referred to as "Attach $\alpha$") or the theory of Attach Alpha, is a solution to the above-described problem.

Some of the problems that underlie the lack of success of known methods are due to the fact that no theory of syntax has yet been able to claim wide acceptance as a thorough and complete theory. Known theories and methods are either to complex or too poorly or too vaguely formulated to be implemented in a programming language. Finally, a significant obstacle to the implementation of a theory of grammar in a computer program is the fact that such known theories typically generate hundreds, thousands, and even hundreds of thousands of possible parses of one sentence, leaving the computer and the user unable to choose a correct analysis of a sentence.

Known parsers are severely limited since they cannot sufficiently limit the number of possible parses that they produce. If the number of possible parses are too great, processing time increases to a point where real-time output is impossible. In many known parsers, ambiguity in the input string results in an exponential increase in the number of possible output sentences. For example, the sentence "john does like to put the book in the garage", although quite simple in comparison with common English sentences, can produce over 3,000 parses or combinations of sentences. This can be computed by finding the number of possible interpretations of each of the items in the string and counting the number of sentence combinations. In the above-described sentence, "john", "does", and "to" each have two possible meanings, and "like" has four possible meanings, and so on. The combination of possible parsed sentences quickly increases rendering known parsers essentially inoperative.

Accordingly, it is an object of the present invention to substantially overcome the above-described problems.

It is another object of the present invention to provide a novel method and apparatus for parsing sentences that is universally applicable to all languages of the world.

It is a further object of the present invention to provide a novel method and apparatus for parsing sentences that is implemented on a known digital computer and operates in real time to analyze and parse complex sentences.

It is also an object of the present invention to provide a novel method and apparatus for parsing sentences that significantly reduces the number of parse combinations analyzed, rendering such analysis feasible on a computer.

It is still an object of the present invention to provide a novel method for parsing sentences that strictly limits all structure to that which can be stated in terms of the attachment of two items proceeding from the smallest items upwards toward the completed sentence.

SUMMARY OF THE INVENTION

The disadvantages of present natural language parsers are substantially overcome with the present invention by providing a novel method and apparatus for natural language parsing.

The present inventive method is a syntactic parser developed from a novel theory of syntax, and includes specialized algorithms and parsing strategies that have been used to implement the theory in a computer program. The parser and the theory of syntax are unique in that the theory is applicable to all of the problems of syntax and grammar of a language. As noted above, the theory referred to as "Attach Alpha," and described in detail herein, is the underlying framework for the present inventive method and apparatus. Accordingly, the phrase "method and apparatus" in reference to the novel invention may be referred to interchangeably as "Attach Alpha" or "the parser," hereinafter.

One specific embodiment of the novel method is available for the English language, but may be easily be applied to all languages with minor adjustments. More importantly, all of the theoretical mechanisms used in the theory are easily implemented in a programming language. Thus, the parser is capable of analyzing the full range of grammar and syntax as well as manipulating sentences to create other structures.

Further, the novel parsing method is capable of question/answer and statement/response repartee in real time. The novel parsing method is many times faster than current computer based implementations and operates at higher speeds than all known parsers, particularly when parsing sentences having up to 12 or 15 words with one or two internal clauses. Such a significant increase in processing speed results because the novel parsing method has significantly reduced the problem of analyzing the hundreds, thousands, and hundreds of thousands of possible parses for individual sentences that result from using known parsers and theories of language. No known parsers can successfully perform the functions described herein and no known parsers can fully process an input string in real time, as such parsers fall victim to the hundreds and thousands of possible parses that result when such known parsing algorithms are executed.

The present theory and method has initially been applied to English, but the same theory and method, with minor modifications, is applicable to all of the other languages of the world. For example "minor modifications" mean such simple changes such as respecifying the order of adjectives (e.g. the adjective before the noun in English and other Germanic languages, but the adjective after the noun in romance languages) to more complex matters such as the association of pronouns and reflexives with their antecedents or the association of topics, question words, and other displaced items with their correct role in the sentence.

The grammar analysis, the theoretical mechanisms of the theory that underlie the parser, and the parsing strategies and algorithms described herein may be successfully implemented in a fully operational embodiment using known digital computers appropriately programmed in a selected programming language. The above-identified items provide the unique ability to permit real language interactions with computers and computer applications as well as significant improvements in speed, accuracy, scope, and thoroughness of all grammar analysis problems.

The inventive method and apparatus includes four broad areas: 1) the parser which includes many subroutines and functions that operate on a sentence to perform linguistic and grammatical evaluations, manipulations, and question/answer and statement/response repartee; 2) the theoretical mechanisms based on the theory of Attach Alpha which underlie the parser and its functions and which will be used with minor modifications for other languages of the world; 3) parsing strategies and parsing algorithms, and 4) the series of features and strategies used to manage the dictionaries.

Currently, according to a specific embodiment, a 60,000 word dictionary is used. However, the parser would function properly with much larger or with much smaller dictionaries. Dictionaries are modified to meet the requirements of the present theory and method. Modifications to the dictionary and or the addition or subtraction of lexical features can have profound effects on the operation of the parser. For this reason, the particular nature of the dictionary is unique.

Based on the present inventive method and apparatus, the ability exists to analyze the full range of English grammar and syntax to create much improved grammar checkers, translation devices, foreign language and linguistics tutoring applications, language interactive products, and the like. The theory and inventive mechanisms described herein can be readily adapted to handle any of the world's five thousand (and more) languages. Note that the description included herein frequently refers to the English language. This is done for reasons of illustration only.

The fact the present method and apparatus can handle the full range of grammatical and syntactic phenomena means that a significant improvement can be brought to all software that currently requires grammar analysis of any sort. Additionally, the present method and apparatus can open a new field of language interactivity where real-language question/answer and statement response repartee based on the analysis of grammar is possible.

More specifically, the method and apparatus for natural language parsing according to one specific embodiment of the present invention includes the steps of a) retrieving the input string; b) performing a dictionary look-up for each word in the input string to form a correspondence between each word and a dictionary entry in the dictionary, the dictionary entry providing lexical features of the word; c) processing the words in the input string beginning with a last word in the input string and continuing toward the first word in the input string; d) the processing of the words in the input string including the steps of associating a selected word in the input string with a word located to the left of the selected word in the input string to form a word phrase, said associating performed according to predetermined selection restriction riles; and e) repeating steps (c) and (d), processing the words in the input string, until all words of the input string have been processed.

An another specific embodiment, the steps include a) retrieving the input string; b) performing a dictionary look-up for each word in the input string to form a correspondence between each word and a dictionary entry in the dictionary, the dictionary entry providing lexical features of the word; c) processing the words in the input string beginning with a last word in the input string and continuing toward the first word in the input string; the processing of the words in the input string including the steps of e) attaching a selected word in the input string to a preceding word in the input string, the attachment performed if permitted by at least one predetermined selection restriction rule and not performed if not permitted by at least one predetermined selection restriction rule, the attachment of the selected word to the preceding word forming a word phrase, the selection restriction rules based upon predetermined lexical features of the words in the input string; f) promoting the selected word or the word phrase in the input string to a next higher lexical value if permitted by at least one promotion restriction rule; and repeating the steps (c) through (f), including attaching and promoting, until all words of the input string have been processed.

An another specific embodiment, the steps include of: a) inputting the input string; b) performing a dictionary look-up for each word in the input string to form a correspondence between each word and a dictionary entry in the dictionary, the dictionary entries providing lexical features of the word; c) assigning a first level of strength to each word in the input string, the first level of strength defined by the dictionary entry corresponding the word and identifying a basic grammatical category associated with the word; d) selecting a word in the input string to process, the selected word corresponding to a last word of the input string; e) determining if the selected word attaches to an immediately preceding word in the input string, the determination performed according to predetermined selection restriction rules and resulting in a successful attachment or an attachment failure; f) the successful attachment resulting in formation of a word group linking the attached words, the word group assigned either the first level of strength, a second level of strength, or a third level of strength, the levels of strength defined by the predetermined selection restriction rules; g) the attachment failure resulting in an attempt to promote the word group to a next higher level of strength, until the word group attains the third level of strength; and h) selecting the next word in the input string located to the left of the selected word and performing steps (e) through (g) until all words in the input string have been processed.

BRIEF DESCRIPTION OF THE DRAWINGS

The features of the present invention which are believed to be novel are set forth with particularity in the appended claims. The invention, together with further objects and advantages thereof may best be understood by reference to the following description in conjunction with the accompanying drawings.

FIGS. 6A–6D are pictorial representations showing how words or items of a sentence are linked and organized;

FIGS. 11–12 are flowcharts illustrating a specific embodiment of a parser according to the present invention, particularly showing syntactic, grammatic, and manipulation type subroutines and functions.

DETAILED DESCRIPTION

The present method is implemented as parser in a known digital computer and preferably uses a standard WINDOWS® interface to demonstrate the functions described herein. However, any suitable interface or operating system may be used, such as Unix, Microsoft WINDOWS® 95, WINDOWS® 3.1 WINDOWS® NT, IBM OS2®, MACINTOSH OS, and the like, or non-windows operating systems, such as Microsoft DOS®. Such know digital computers may be IBM compatible computers, Macintosh compatible computers, and the like. However, the present novel method and apparatus is not limited to personal computer type machines and may, for example, be ported to minicomputers and mainframe computers. Preferably, the software embodied in the novel method and apparatus is written in the object oriented language of C++ and compiled on Borland C++ compiler Version 4.5. However, any suitable computer language and compiles may be used.

Figure 1:
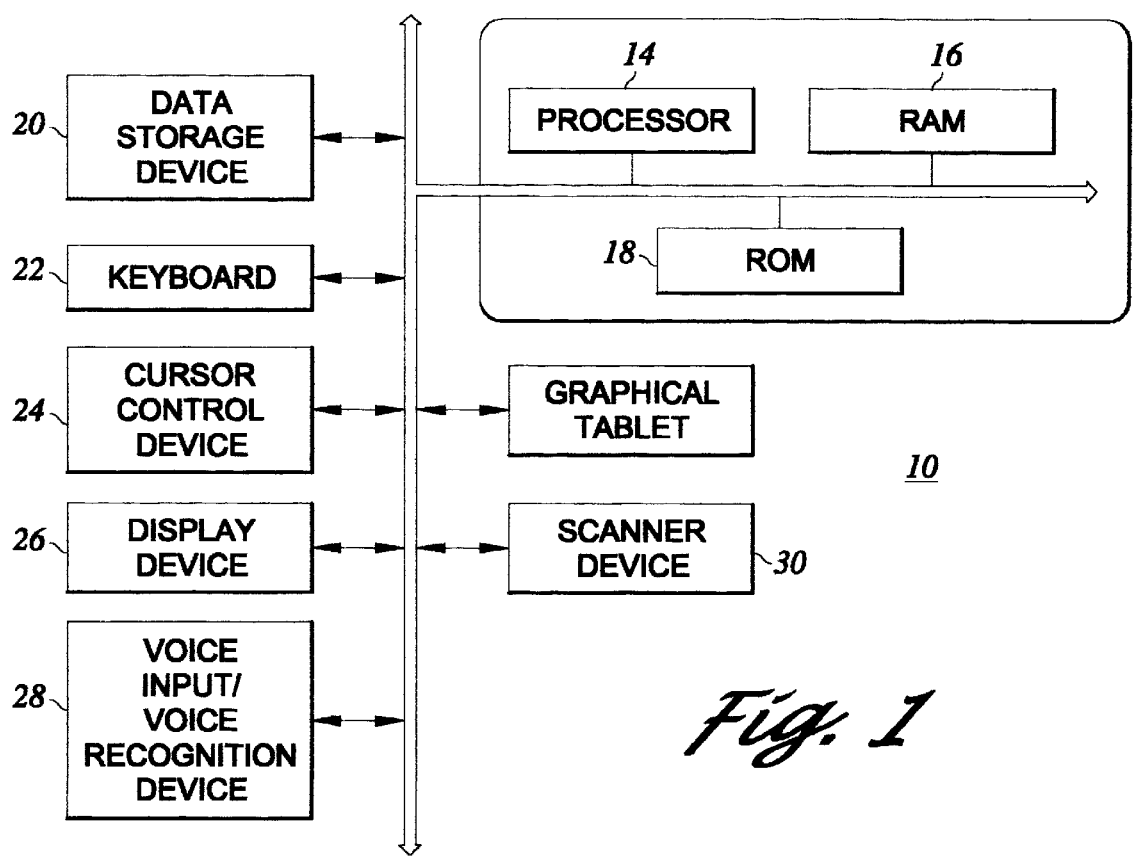
FIG. 1 is a specific illustration of a block diagram of a computer system according to a preferred embodiment of the present invention.

Referring now to FIG. 1, a block diagram of a known computer system is shown which may represent the preferred embodiment of the present invention. However, the preferred embodiment may be practiced on computer systems having alternate configurations, as are known in the art. FIG. 1 illustrates some of the basic components of such a computer system, but is not meant to exclude other components or to imply that such components are necessarily discreet. The computer system 10 includes a bus or other communication means 12 for communicating information, a processing means 14 coupled to the bus for processing information, a random access memory 16 (RAM), commonly referred to as main memory, coupled to the bus for storing information and instructions for the processor, and a read only memory 18 (ROM) or other static storage device coupled to the bus for storing static information and instructions for the processor.

Other devices coupled to the bus 12 include, for example, a data storage device 20, such as a magnetic or optical disk drive for storing information and instructions, an alphanumeric input device 22 for communicating information and command selections to the processor 14, a curser control device 24, such as a mouse, track ball, curser control keys, and the like, for controlling the curser and communicating information and command selections to the processor, a display device 26 for displaying data input and output, and voice recognition or voice input device 28 for converting speech into text to be supplied to the processor. A scanner 30 may also be coupled to the computer system 10 through the bus 12.

In one specific embodiment of the present invention, the parser is implemented on a known digital computer, and requires about one megabyte of RAM and 400 kilobytes of disk space. The dictionary includes about 60,000 words and occupies about two megabytes of disk space.

With respect to processing an input sentence, computer users want to use real language to interact with computers (with both speech and text). In order to do this, a computer or the embodiment of the parser must recognize questions as questions, statements as statements, correct tense, negative/affirmative statements, and so on. In addition, the parser must be able to manipulate sentences; for example, to make questions from statements, passives from actives, and so on. To recognize and manipulate such structures, the parser first requires the ability to identify parts of speech, parts of the sentence, sentence type (question, statement, etc), and so on.

Because of the theory of syntax, Attach Alpha, that underlies the present inventive method and apparatus, and because of the novel parsing strategies and algorithms described herein, the parser or inventive method does not fall prey to the prohibitively excessive numbers of possible parses that currently stand as a major obstacle to the creation of a parser that can operate in feasible manner on a known computer.

With the above logic in mind, the novel method described herein is embodied in a parser having the ability to do the following significant processes: The parser receives an input string, such as a sentence or grouping of words and: 1) labels part of speech (noun, adjective, verb, etc.), 2) labels parts of the sentence (subjects, objects, and so on), 3) changes active to passive and passive to active, when directed to do so, 4) formulates yes/no questions, and wh-word (who, what, when, where) type questions, 5) labels sentence type, 6) labels tense, 7) labels clauses, 8) identifies part of speech, and 9) checks punctuation, when directed to do so. In addition, there are background processes that create tree diagrams and labeled bracketing diagrams of all the parses that are tried.

The fact that all of the above is successfully performed implies that the parser described herein successfully handles all the grammatical problems of the English language (and of course other languages) because all such problems are merely variations of the syntactic functions that have been described. The parser typically processes sentences of twelve to fifteen words in length having two or three clauses, in real time. Although longer or more complex clauses may slightly slow the processing longer sentences may still be successfully processed in real time. For purposes of illustration, the output of two sentences generated by the parser according to the novel method and apparatus are presented below and are labeled "Sentence Number One," and "Sentence Number Two."

Sentence number #1: John gave Mary a book
  Parts of Speech identified:
  "John" is a proper noun.
  "gave" is a verb.
  "Mary" is a proper noun.
  "a" is an indefinite article.
  "book" is a noun.
  Parts of Sentence identified:
  "John" is the subject of "gave."
  "a book" is the direct object of "gave."
  Passive to Active:
  Conversion to active not necessary.
  Active to Passive:
  Mary was given a book by John
  Statement to Yes/No Question:
  Did John give Mary a book?
  Statement to Wh Question:
  Who gave Mary a book?
  Whom did John give a book?
  What did John give Mary?
  Sentence Type:
  This sentence is simple.
  This is a statement.
  Clauses:
  No internal clauses
  Tense:
  Simple Past.
  Punctuation:
  No special Punctuation necessary.
Sentence number #2: The student whom Mary likes is reading a book Sentence
  Parts of Speech:
  "the" is a definite article.
  "student" is a noun.
  "whom" is a wh word.
  "Mary" is a proper noun.
  "likes" is a verb.
  "is" is a verb.
  "reading" is a verb.
  "a" is an indefinite article.
  "book" is a noun.
  Parts of Sentence:
  "whom" is the object of the verb "likes."
  "Mary" is the subject of the verb "likes."
  "the student whom Mary likes" is the subject of "is reading."
  "a book" is the object of "is reading."
  Passive to Active:
  Conversion to active not necessary.
  Active to Passive:
  A book is being read by the student whom Mary likes.
  Statement to Yes/No Question:
  is the student whom Mary likes reading a book?
  Statement to Wh Question:
  Who is reading a book?
  what is the student whom Mary likes reading?
  Sentence Type:
  This sentence is complex.
  This is a statement.
  Clauses:
  Whom Mary likes: is an adjective clause modifying "the student."
  The adjective clause is simple present.
  Tense:
  Present progressive.
  Punctuation:
  No special Punctuation necessary.
  One example of punctuation problems solved by the inventive method and apparatus is shown below:
  Input:
  Because John likes reading he is a student.
  Punctuation Check Output:
  Because John likes reading, he is a student.

The above examples represent the output of the parser for purposes of illustration. There are many more functions that are not necessarily illustrated by the above examples. All of the basic functions of English syntax, universal grammar, and what is referred to as "standard English grammar" are provided herein.

The parser includes three main routines and many subroutines and functions, as will be described in greater detail hereinafter. Within these routines, subroutines, and functions are contained the theoretical mechanisms of the theory of Attach Alpha. This detailed description of the invention is divided into two sections for purposes of illustration, as follows: 1) the theory of Attach Alpha, and 2) a description of the parser, including a description of the flowcharts, and a description of parsing strategies and algorithms.

The theory of Attach Alpha.

1. The present inventive method demonstrates that by beginning with a theory of phrase structure which is rigidly limited to a step by step process of attachment of lexical items into larger words, phrases, and sentences, it is possible to provide a theory of syntax that is simpler and more general than current theories of syntax and which does not require deep structure, movement, deletion, or insertion. Further, the theoretical machinery required for this novel theory is much more restricted than that required by current theories. The many miscellaneous theoretical subcomponents such as c-command, barriers, subjacency, the Empty Category Principle, Government, Proper Government, Lexical Government, etc., as is known in the art, are either not required in the present inventive method or fall out from other subcomponents which arc included in the present inventive theory and method. Finally, all the theoretical mechanisms of Attach Alpha that underlie the present inventive method can be easily implemented in a variety of programming languages.

The present framework requires only one empty category and seven theoretical mechanisms, as follows: 1) rules of attachment, 2) a series of selection restrictions and subcategorizations that constrain the application of Attach α and determine the category, bar level, and lexical features of the item created by Attach α, 3) a principle to account for the assignment of bar levels in intermediate and maximal structures, 4) a description of the completion of the process of attachment, 5) a description of theta role assignment and interpretation, where "interpretation" of theta roles refers to the process by which N2s are associated with empty categories in order to receive a theta role, 6) the principles which describe the coindexing requirements of non-referential expressions, and 7) the morphological principle of locality referred to as the Immediate Dominance Condition. Also, the seven above-described mechanisms, with minor language specific changes in parameters, are the same in all languages of the world and constitute the full set of theoretical mechanisms necessary to account for the syntax of the languages of the world.

After providing a description of phrase structure, uses of the above-described theoretical devices are illustrated along with a description of several major principles and unique definitions of terms to provide an account of the following phenomena: 1) the assignment of theta roles and empty categories in sentences in which arguments are displaced from the position specified in the theta grid, such as questions with sentence initial wh words, Tough Movement sentences, topicalized sentences, relative clauses, and Cleft and Pseudo-Cleft sentences (also included are restrictions on such displaced arguments such as Pied Piping and the Complex NP constraint), 2) the assignment and interpretation of theta roles in missing constituent sentences such as Control sentences, 3) Parasitic Gap sentences, 4) Island Conditions, 5) the That Trace Effect, 6) the variable presence of overt subjects in infinitival phrases, 7) the coreference requirements of reflexives, reciprocals, and pronouns, and 8) Strong and Weak Crossover Effects.

For convenience and for consistency of reference to prior art literature, the terminology of the Government and Binding theory will be used in reference to the above-described phenomena. One significant point of departure for the present theory is in the theory of phrase structure in which all structure results from the sequential attachment of two items which proceeds from lexical items into larger words, phrases, and sentences, without external devices to constrain the possible trees, such as X-bar theory or phrase structure rules.

In a manner that is consistent with evidence from polysynthetic languages, such as Eskimo languages and nonconfigurational languages, such as Warlpiri, the theory underlying the present inventive method and apparatus proposes that all morphological and syntactic structure is essentially the result of one unitary process which allows lexical items to attach to either other lexical items or to phrases, depending on subcateorizations and selectional restrictions in a manner that is not constrained by a rigid boundary between morphology and syntax. That is, all structure is the result of the successive attachment of lexical items into complex words, phrases, and sentences which begins with items chosen from the lexicon (dictionary) and proceeds upwards to completed sentences.

Unlike known theories of syntax which limit the number of possible syntactic strings by means of different top-down phrase structure formulations in a manner that precedes downwards from the largest possible item e.g., phrase or sentence (S) to the smallest possible item e.g., lexical items or dictionary definitions, the present theory strictly limits all structure to that which can be stated in terms of the attachment of two items proceeding from the smallest items upwards to completed sentences. The term "top down" structure, as used herein, means all theoretical devices or rules that cannot be applied in a literal step-by-step fashion from lexical items to completed sentences, and which must be applied as "well-formedness" conditions on possible strings. The term "bottom up" structure, as used herein, means any theory that builds all structure from a literal series of statements about attachments. Chomsky (The view from Building 20: Essays in Linguistics, Keyser: 1993) presents a theory that claims to be bottom up. However, the X-bar theory still operates as a well-formedness condition on completed strings. Thus, this version of Chomsky's theory is not rigidly bottom-up. If Chomsky's theory could predict the bar levels as the process of attachment proceeded, it would be closer to a bottom up theory-but this is not the case. In fact, the present inventive Attach α theory underlying the method described herein is the only theory of syntax with accounts for the creation of all structure in terms of bottom up directionality. In other words, instead of generating abstract tree structures that must be lexically filled, this grammar creates all structure directly in a single operation.

Categorical Grammar generally refers to the application of rules which create structure in terms that begin from the bottom and proceed upwards. However, the complex formulae they provide, such as the combinatory rules cited in Steedman (1987), 'Categorial Grammars and Parasitic Gaps.' Natural Language and Linguistic Theory 5:403–40.) cannot be applied as literal statements of a sequence of attachments, and therefor must be taken as well-formedness constraints on possible structure. For example, the rule that specifies the attachments for a transitive verb is given in (i), shown immediately below, where a "/" (forward slash) indicates a rightward attachment and a "\" (backward slash) indicates a leftward attachment.

(i) (S\NP)/NP where S is the sentence level and NP is the noun phrase or N2 level.

The derivation of (i) proceeds upwards, beginning with /NP, to the completed phrase or sentence (S). However, such rules can be applied literally only in those cases when there are no adjuncts attached before the subject is attached. If adjunct arguments are attached, the subcategorization has to be interrupted partially through, in order to allow the application of the rules that attach adjuncts. Then, the subcategorization must be reactivated from where it left off after the attachment of the adjuncts.

Since it is not possible for such subcategorizations to be treated as a literal statement of attachments, it must instead be regarded as a well formedness condition on possible structure. As the sentences in (ii), shown immediately below, indicate, subcategorization frames do not generally allow interruptions. The asterisk indicate an error or incorrect sentence.

(ii) Double Objects
1. A. John gave a book to Mary at 5 o'clock.
B. John gave Mary a book at 5 o'clock.
2. A. *John gave at 5 o'clock a book to Mary.
B. *John gave at 5 o'clock Mary a book.
3. A. *John gave a book at 5 o'clock to Mary.
B. *John gave Mary at 5 o'clock a book.
(iii) Transitive verbs
1. John ate an apple greedily.
2. *John ate greedily an apple.
(ii) Verbs with two complements.
1. John gladly put the car in the garage.
2. *John put gladly the car in the garage.
3. *John put the car gladly in the garage.

Operations, such as the interpretation of empty categories and the evaluation of coindexing requirements for non-referential expressions, are evaluative measures that are applied after the creation of structure. They play no role in creating structures.

The present theory of Attach Alpha underlying the inventive method includes of two major aspects: one that creates structures and one the evaluates structures. Using this basic system to provide a software implemented parser, it is possible to analyze, evaluate, and manipulate sentences in a manner that permits real-time use of real language with computers and computer applications. The two aspects of creation and evaluation of structure are accomplished using eleven points of universal grammar. Each of these points is unique and their use in concert is unique in the present inventive method. The following is a brief overview of each of the eleven points of the present inventive method.

1. Attachment. Any constituent X attaches to any other constituent, as specified in the selection restrictions.

2. Promotion; Promotion after attachment: a) an X0 that immediately dominates another X0 is promoted to an X1; b) an unattached item is promoted by 1 (2 is maximal).

3. Specifier attachment. Items attached at the X1 level are specifiers. X2s are completed by X0 specifiers (e.g. D0s are X0 specifiers). A-domains are completed by X2 specifiers (possessive N2s and nonsubcategorized wh words are X2 specifiers).

4. Argument (A-) domain. An A-domain consists of any N or V head and its arguments.

5. Terminal Argument. A terminal argument is either the first or last required argument attached to an A-domain.

6. Required arguments. Subcategorized and theta marked arguments are attached as stipulated in the lexical entries of the dictionary. An empty category (e.c.) is attached is there is no overt item present for theta role assignment.

7. Nonrequired arguments. All nonrequired arguments must be attached to the independent A-domain of their head.

8. The Immediate dominance Condition. A selection restrictions can refer to the lexical category it selects plus the nodes immediately dominated by the category.

9. Independent. A nonsubcategorized item is independent.

10. Interpretation. Interpretation of e.c.s. begins when all attachment is completed, or when a topic (a nontheta marked N2 modifier in a final argument) is attached. Interpretation begins with the first e.c. attachment:

a) an e.c. is interpreted with a nontheta marked final N2 attached to or within its smallest independent A-Domain;

b) in [-finite] clauses: an e.c. is interpreted with the nearest available N2.

11. Coindexing restriction.

a) An r/r must corefer with terminal arguments in the smallest A-domain in which it is included, and (if available) a higher terminal.

b) A pronoun cannot corefer with a coargument (a coargument=an argument of the same head) in the same A-domain.

c) An r-expression cannot corefer with items within its smallest independent argument.

d) A possessive cannot corefer with nonterminal arguments or N2s in nonterminal arguments.

The Dictionary

The dictionary in an important and integral part of the implementation of the parser. Words or entries are "looked-up" and lexical information is returned. The first feature of the dictionary entry is called the "lexical" feature and refers to basic syntactic information, such as whether the word is plural or singular, whether it is a participle or not, and the basic part of speech, such as nouns, verbs, adjectives, adverb, etc. For example, the lexical features associated with the noun "John" may include masculine gender, singular member, and count.

The second feature refers to what type of structures can follow all verbs, and in some cases, nouns. For example, a transitive verb is followed by an object, as illustrated in the sentence "John ate a sandwich." In this sentence a ditransitive verb is followed by two objects, as in the sentence "John gave Mary a book." This second feature in the dictionary entry is referred to as the subcategorization frame.

The third feature is called the "theta-grid" and lists the "theta-roles" that a verb assigns. Entries in the theta-grid only exist for verb entries. The theta-role provides the relationship of an item to the verb. For example, the subject of the sentence "John ate a sandwich" is "John," and its relationship to the verb is that of "agent" or "doer" of the action. The word "sandwich" is the object and its role is that of "theme" or "receiver of the action." At first view, this may appear unnecessary since we already have the terms subject and verb in the first and second features of the dictionary. However, it is clear from the passive version of the above sentence, "a sandwich was eaten by John," that the position of the subject and the verb have been reversed while the roles of "doer" and "receiver of action" have not been reversed. Thus, theta-role is the relationship of an item to a verb or preposition and the theta-grid is the list of those roles in the dictionary.

The terms that may be assigned to the theta-roles are: agent, theme, compliment, goal, locative, time, instrument, and complement. However, this list is not exhaustive and other terms may be added or deleted where applicable without affecting the basic operation of the novel method. The agent is the doer of action, the theme is the person or thing affected by the action, the goal is the person or thing toward whom the action is directed, the locative is the location where the action occurs, and the time is the time at which the act takes place, if applicable. The instrument is the tool or means by which the action is performed and the complement is used for complements of linking verbs. For each word in the dictionary, the part of speech corresponding to that word is defined as part of the lexical features of the word. A letter and number identifier are given to identify the part of speech as follows:

Noun (N0: common noun; N2: proper nouns, pronouns or acronyms)

Question words (N2W: who, what, when, where, why, etc.)

Preposition (P0, P3 not originally in dictionary, created during processing to handle particles)

Verb (V0)

Determiner (D0: the, a, this, that, etc.)

Adjective (A0)

Adverb (B0, B2)

Subordinating conjunction (S0)

Coordinating conjunction (K0)

Transition (T0)

Auxiliary (a subclass of V0)

Modal (included in auxiliary)

Complement (C0: that)

Gerund (G0)

Infinitive marker (F0: to)

For each of the above-defined items or entries in the dictionary, each item may be given one of three levels of strength as processing of the phrase or sentences proceeds. All grammatical categories, such as adjective, verb, noun, and the like, can be described as having an associated basic, intermediate, or maximal strength represented by X0, X1, or X2, also known as X-bar levels or bar levels. For example, a noun (N) may be represented as N0, N1, or N2 representing basic strength, intermediate strength, and maximal strength, respectively. In general, the "0" level or strength are dictionary items or entries. Each part of speech is generally associated with the basic level or "0" level of strength prior to processing by various routine. The "1" level or strength are intermediate to base words and phrases, and the "2" level or strength represents full phrases or sentences.

For example, the dictionary may be a 60,000 word dictionary version of the COMLEX® dictionary available from the Linguistic Data Consortium at the University of Pennsylvania. However, any suitable commercially available linguistics-oriented dictionary may serve as the base dictionary, subject to modification to permit object-oriented software access to the data contained therein.

Any theory of structure based entirely on the successive attachment of lexical items into larger units will not result in a framework that conforms to the requirements of the X-bar theory. Accordingly, in known theories, the X-bar theory must to be added to guarantee that only the required structures are generated. For example, the attachment of an adjective to a noun does not in itself produce an N1 level. Also, the attachment of an argument to a verb does not itself produce a V1. It is necessary to consult the X-bar framework to determine the bar levels that result from particular attachments. Further, from the point of view of the sequential attachment of lexical items in known theories and methods, there is nothing to prevent attachments that violate X-bar theory, such as the attachment of a determiner to an NP, rather than to an N1. Only an external "top down" structural framework, such as the present inventive method and apparatus, can overcome such problems. The present inventive method and theory of Attach Alpha underlying the method avoids this difficulty by using a principle that generates intermediate categories and bar levels along with the generation of structure. This principle, called Promotion, is presented in greater detail in subsection (5) entitled Promotion.

The theory described herein generates all structure by the rule of Attach α which creates structure through the successive attachments of lexical items to create complex words, phrases, and sentences based on the requirements of the selection restrictions. The rule of Attach α also makes it possible to remove the need for the double listing of these requirements in both the Word Formation Rules and the lexical entries of the individual affixes. Thus, use of the rule of Attach α reduces the amount of theoretical machinery necessary for the theory of morphology.

Just as the rule of "move α" (plus accompanying constraints) presented in Chomsky ("Conditions on rules of grammar," *Linguistics Analysis* 2:303–351, 1976) makes it possible to do without the massive accumulation of transformations that characterized earlier versions of Chomsky's theory, so the rule of "Attach α" (with accompanying selection restrictions) makes it possible to do without the wide array of constraints and principles that characterizes current theories of syntax and known methods associated therewith. The rule of Attach α is constrained by selection restrictions such as subcategorizations, and Categorial selection restrictions which make statements about the general properties of allowable attachments such as, "adjectives attach to nouns," or "determiners attach to N1", as will be described in greater detail hereinafter. Further, by requiring that all structure be specified in terms of a step by step process of attachment, both the generation and analysis of strings is significantly simplified. Attach α is described below in greater detail in (1).

(1) Attach α

The items to which Attach α applies are either lexical items or items that have been created by previous applications of Attach α. The node that results from the attachment of the two items is given the category, bar level, and lexical features of the head. In general, the head refers to the item being modified. A head is determined by looking at the selection restriction and determining which item will give the lexical features to the newly created item. Thus, if the adjective 'big' is attached to the noun 'dog,' the result is the item 'big dog.' Since 'big dog' acts as a noun, the newly created item is a noun and, thus in the selection restriction, the noun is said to be head. Nonheads in a selection restriction are called modifiers. The head of the newly created item and the order of attachment (head first or head last) are stated as part of the selection restrictions. There are two kinds of selection restrictions, those which provide the distribution facts of categories, as shown below in subsection (2A), and standard subcategorizations as shown below in subsection (b) for the verb put. An extensive list of selection restrictions is provided in subsection 6 entitled Selection Restrictions.

(2) A. An adjective attaches to the left of the noun it modifies.

B. put [—N2 P2] (where N2 is the noun phrase and P2 is the prepositional phrase)???

Selection restrictions generally specify the attachment of one item to another item. However, verbal subcategorizations are selection restrictions that often specify more than the attachment of just one item. In order for such subcategorizations to conform to the requirements of bottom up structure, each item of the subcategorizations must be attached sequentially without interruption. That is, if a subcategorization is not treated as a literal statement of allowable attachments, it becomes a well-formedness condition on completed trees, which violates the bottom up form of structure of the current theory. Theoretically, Attach α can attach any lexical item to any other lexical item or any item formed by previous applications of Attach α, but the selectional restrictions and subcategorizations determine whether or not particular attachments are grammatical. Given the restricted notion of phrase structure in this theory, all possible attachments must be described in a selectional restriction or the attachment is not licensed.

Example (2), shown immediately below, illustrates the basic principles of attachment and promotion in a simple sentence:

EXAMPLE (2)

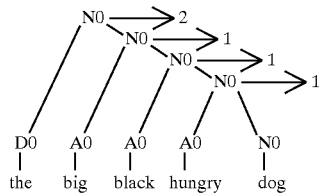

In the above sentence, "the" is a determiner D0, "big", "black", and "hungry" are adjectives A0, and "dog" is a noun N0. First, attachment is attempted using the selection restriction that permits an A0 to attach to an N0 forming an N0. The attachment of "hungry" to "dog" forms a level N0. As attachment continues in a right to left manner, the A0 corresponding to "black" and "big", respectively, are sequentially attached forming three levels of N0 above the initial level of N0 formed by the lexical entry corresponding to "dog."

Attachment finally fails when D0 is encountered because no selection restriction permits attachment of a D0 to an N0. Once attachment fails, promotion is attempted. Note that three occurrences of N0 dominate the lowest level N0. Promotion rules specify that an X0 (meaning, any identified part of grammar, such as N (noun), V (verb), A (adjective)) that immediately dominates another X0 is promoted by one level to an X1 level. Accordingly, each dominating N0 is promoted to level N1 leaving three level N1s dominating the level N0. This "dominance-type" promotion rule may be referred to as Promotion part A, and is always attempted before attempting Promotion part B, described hereinafter.

Once promotion is complete, attachment is again attempted. Given the current levels indicated in the example, there is a selection restriction that permits a D0 ("the") to attach to an N1 to form a level N1. Next, attachment continues but fails because there are no more words in the string to process. Accordingly, promotion is again attempted. In this iteration, the above-described "dominance-type" or Promotion part A cannot be applied since the proper condition does not exist. Therefore, Promotion part B is attempted. Promotion part B specifies that an unattached item is promoted by one level, up to the maximum level. Therefore, the unattached N1 is promoted to a level N2. The N2 level indicates a complete phrase or sentence (S) has been fully parsed.

Example (3), shown immediately below, illustrates the process of attachment in a simple sentence. The final and intermediate bar levels are not completely specified in (3). Bar levels are discussed in Section 3 and are further illustrated in example (6).

EXAMPLE (3)

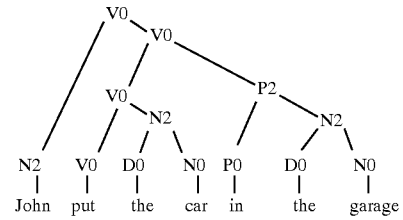

Since this method allows no other means of phrase formation other than Attach α, all arguments must be fully formed before they can be attached to the verb. Thus, in sentence illustrated in example (3), John put the car in the garage, the N2, the car, must be created before it can be attached to put. Similarly, P, in the garage, must be created before it can be attached to the phrase, put the car. The attachments of lexical items that produce the arguments of the verb must also be specified in selection restrictions or subcategorization frames.

In this method, tense is attached directly to a verb as an affix. There are no INFL, TNS, or AGR nodes, as exist in the well known Government and Binding theory. The attachment of every verbal argument results in the creation of a V0 because the V0 is the head. As with other attachments, the lexical features of the head are assigned to the V0 that is created by the application of Attach α.

Auxiliary verbs are attached to a main verb as any other attachment, as illustrated in example (4) immediately below. (Intermediate categories are not included in trees until shown in example (6)).

EXAMPLE (4)

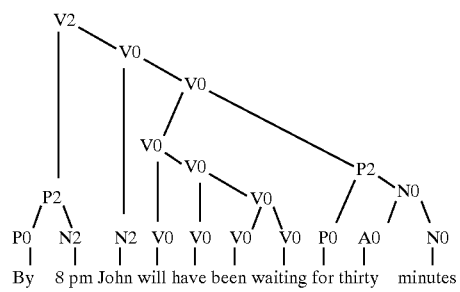

In the sentence of example (4), all the auxiliaries are attached as modifiers of the main verb (see selection restriction (Cviii) in Section 6). The main verb is the head, so the V0 category of the head and the lexical features of that head (including subcategorization frame and theta grid) become the category and the lexical features for the item created by the attachment of the auxiliary to the main verb. Thus, been is attached to waiting, and have is attached to been waiting and so on. During this process, all theta grid, subcategorization frame, and other lexical features are the same for the newly created item as they are for the head (the main verb). Thus, in example (4), the lexical features for the uppermost V0 are identical to those of the lexical entry of the main verb. As auxiliary verbs, the verbs have, do, and be are attached by selection restrictions: i.e., they do not have subcategorization frames and do not assign theta roles. As main verbs, the verb be assigns a "theme" theta role to its left while both the verb have and the verb do assign an "agent" to its left and a "theme" to its right. Theta role assignment is more fully discussed in Section 7.1.

2. Lexical entries

In some cases, lexical items need to specify the hierarchical strength or 'bar level' of a category as part of the lexical entry. Some lexical items are listed as 0, or level 0, and some as −2. The entries preceded by a minus sign are not to be confused with the dictionary entries without the minus sign, or X-bar levels. The minus sign indicates manipulation or identification within a word, such as "un" or other prefixes. The minus sign is developed as the parser processes words and phrases and is only a temporary indicator. This is necessary to capture generalizations about the distribution of lexical items in morphology. For example, it is necessary to distinguish between those items which can only serve as input to a morphological selection restriction (such as some affixes) and those items which can also serve as an item in the syntax (as is the case with most words). Those items which can serve as items in syntax are listed in the lexicon as level 0s while those which cannot are listed in the lexicon as level −2. Level −1 reserved for intermediate categories generated during the process of attachment. The present method accepts this distinction and extends it to syntax as well. That is, just as there are two category strengths in morphology (the 0s and −2s), there are two category strengths in phrase structure as well, that is, the level 0s, already described for morphology, and the level 2s which are phrasal categories. The level 0s of morphology are level 0s in syntax as well.

The level 2s of syntax are distinguished from level 0s in a manner similar to the distinction between 0s and −2s. That is, lexical items that can serve as items in the syntax but cannot serve as objects of a morphological selection are level 2s. Lexical items that cannot serve as morphological objects are: pronouns, anaphors, wh words, and proper nouns. Since these items cannot be selected in a morphological selection restriction, they cannot be 0s. Therefore, they must be level 1s or 2s. Since phrases need an intermediate level as in morphology, the level 1 is reserved to mark intermediate categories in the syntax and a level 2 is used to mark those categories which cannot serve as morphological objects. Besides the fact that the 2s cannot be used as morphological objects, they also have other properties in common as well. For example, level 2s cannot have specifiers attached to them (e.g. you cannot attach a determiner to proper nouns or pronouns) and 2s can serve as phrases without further attachments.

3. Intermediate categories

Intermediate categories and maximal categories are created by a principle called 'Promotion' which creates the intermediate level 1 categories from level 0s, and maximal categories from level 1s. Level 2 is the maximal category or bar level. This principle is presented in (5) immediately below.

EXAMPLE (5)

Promotion

Rule 5A: A level 0 that immediately dominates another level 0 of the same category is promoted to a level 1. (Also referred to a Promotion part A).

Rule 5B: An item left unattached after the application of Attach α is promoted by one level. (Also referred to as Promotion part B). Note that a level 0 is promoted to level 1 and a level 1 is promoted to level 2, where level 2 is the maximum level possible.

The rule of Attach α applies freely as long as it does not violate any selectional restrictions. Attach α will fail, however, when adjacent items in a string do not conform to selection restrictions. When Attach α fails, Promotion is attempted. After Promotion is applied, Attach α is tried again. Example (6), shown immediately below, provides the tree for example (3) (shown above) and includes intermediate and maximal categories formed by the operation of Promotion.

EXAMPLE (6)

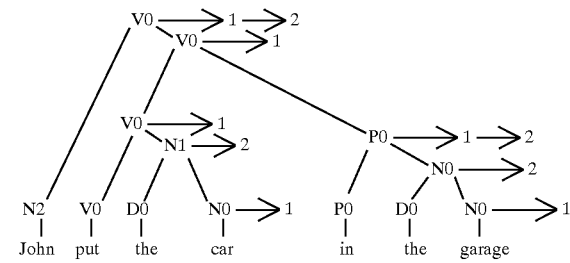

The tree in Example (6) indicates the attachments and promotions that are necessary to create the level 2 verb, V2. The arguments of the verb must be formed before they can be attached to the V0. For example, the N2 the car must be formed before it can be attached to the verb put.

The N2, the car, is formed as follows: a D0 must be attached to an N1, so at first no attachments are possible and Attach α fails. Promotion is then tried which promotes the N0 to the next level, namely, N1. Rule 5A is not applicable so Rule 5B is applied to create an N1 from the N0. Attach α is tried again and it can be applied to attach the D0 to the N1, creating another N1. Because an N1 does not satisfy the subcategorization of the verb, put, Attach α fails and Promotion is tried again. Again, Rule 5A, is not applicable. However, Rule 5B can be applied to promote the N1 to an N2. Then attachment to the verb is possible.

The formation of the P level proceeds as follows: the N2, the garage must be formed before it can be attached to the P0. The selection restriction for D0s states they must attach to an N1, so initially the D0 cannot attach to the N0 garage. Since no attachments are possible at this point, Promotion can be tried. Rule 5A is inapplicable because no level 0 categories dominate identical level 0 categories. However, Rule 5B can be applied to create a level N1. Next, the D0 can be attached to the N1 which creates another N1. In a similar manner the P0, in, cannot attach to an N1 and thus, the N1 is promoted to an N2 which allows the attachment of the P0 to an N2. Next, Attach α is applied to attach the arguments of the verb to the V0 to create a sequence of V0s. After all the arguments are attached to the verb, there are no further possible attachments, so Attach α fails. When Attach α fails, Promotion is tried again. Since there are V0s that immediately dominate other V0s. Rule 5A is applied to create a succession of V1s. The lowest V0 is not promoted because it does not immediately dominate another V0. Attach α is then tried again. There are no possible attachments, so Promotion is tried one more time. Rule 5A is not applicable, so Rule 5B is applied to convert the uppermost V1 into a V2. A sentence is not complete until this last operation of Promotion converts the V1 to a V2. The sentence can then serve as an independent sentence or as an argument of another verb.

Example (7), immediately below, provides a more complex example which illustrates the interaction of morphology and syntax.

EXAMPLE (7)

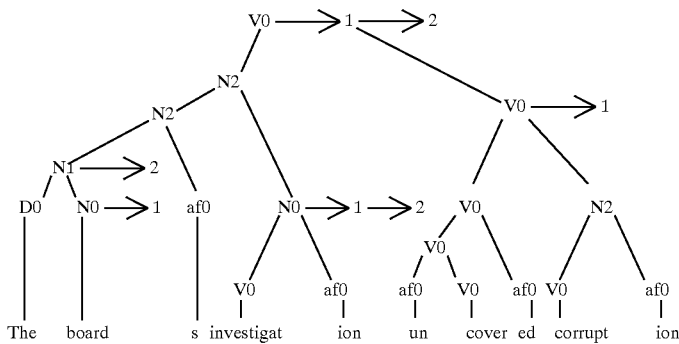

The attachments necessary to create the sentence illustrated in Example (7) proceed as follows. The affix, un- is attached to the verb, cover. The verb is in the past tense so the affix, ed, is attached to the V0, uncovered. Then, the affix -ion is attached to the verb corrupt in order to create a noun object for the verb, uncover. Verbs subcategorize for X2s, so at first the object, corruption cannot be attached to the verb because it is an N0. Since no attachments are possible at that point (i.e. there are no modifiers of that N0), Promotion (Rules 5A and 5B) can be tried. Rule 5A is not applicable, so Rule 5B can be applied to create an N1. There are still no possible attachments, and Promotion is applied once more to create an N2. This makes the attachment of the object to the verb possible. The complex N2 that constitutes the subject must be completed before it can be attached to the verb.

To create the subject, first the affix, -ion, is attached to the verb, investigate to create a noun. There are no possible attachments at this point, so Promotion Rule 5B is applied until the noun, investigation, is at an N2 level. There are still no possible attachments since the genitive affix does not attach to an N2 on its right. There is also no N2 to the left of the genitive affix, as required by its selection restriction, it is not yet possible to attach the genitive. The noun, board cannot be attached to the determiner because the determiner requires an N1. At this point, Promotion Rule 5B is tried to create an N1 from the N0, board. The N1 can then be attached to the D0 which creates another N1. No attachments are possible, so the N1 is promoted to an N2 according to Rule 5B. At this point, the genitive can be attached to the N2. A genitive attaches to a V1, not a V0, so the N0, investigation, must be promoted to N1 before attachment is possible. At that point, the genitive phrase, the boards investigation can be attached to the verb. The attachment of the subject to the verb creates a V0. There are no further attachments, so the uppermost V0 is promoted to a V1 and then to a V2, according to Rule 5B.

Example (8), immediately below, provides an example from Greenlandic, an Eskimo language in which syntax and morphology are very clearly interrelated. (The abbreviation, ALLAT, refers to allative case marking and the abbreviation, INDIC, refers to indicative mood, the forms illu and kar- are monomorphemic.)

EXAMPLE (8)

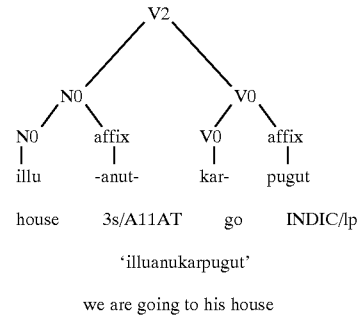

'illuanukarpugut' we are going to his house

Since there is no need to stipulate that all morphological attachments must precede all syntactic attachments, it is possible for words and affixes to be intermixed in a manner that blurs the distinction between words and phrases. This is the case in Example (8) in which the sentence, we are going to his house, is essentially one word in which both syntactic and morphological information are contained.

4. Domains.

The coreference facts of anaphors and the association of empty categories with overt N2s cannot be described without reference to domains; that is, it is necessary to refer to specific structure types within which these principles operate. These structure types are referred to as domains. Note that as used herein, "corefer" or "coreference" involves the reference peculiarities of different types of pronouns. In the sentence "John likes himself," "John" refers to "himself" and "himself" refers to "John." Thus, it is said that "John" and "himself" corefer.

A domain in this theory and method can be a phrase, or a sentence. A phrase is defined simply as any X2, a sentence is a V2. However, for the purpose of delimiting domains, the terms phrase and sentence catnot be distinguished so simply because, as demonstrated in Chomsky's earlier works, phrases with possessive nouns, such as Bob's pictures of himself, constitute a domain that is equivalent to a sentence for the purposes of coreference. The standard explanation of this is that the possessive noun of such phrases acts as a kind of subject, and for that reason, such phrases share certain properties with sentences. Such an analysis is problematic in that it requires the use of the relational notion of 'subject' for a structural description. In the present inventive method, the fact that subjects and N2 heads of a possessive phrase form similar domains follows naturally from the definition of domain.

The term 'subject' does have a structural definition in the current theory. A subject can be defined as any N2 in [X2 [N2 position. This includes heads of possessives and the subjects of sentences. In this theory and inventive method, the term "subject" refers to an N2 in [X2 [N2 position.) In this theory, a domain is formed by the attachment of arguments to either an N or V head and is called an 'Argument Domain.' Argument domain is defined in example (9) below. The fact that possessive phrases are equivalent to sentences for the purposes of coreference is due to the fact that both structure types are argument domains. There is no need to refer to the relational notion of subject to explain this equivalence. The attachment of arguments to other categories such as P0s and C0s does not form A-domains, because such items are not Ns or Vs.

EXAMPLE (9)

Argument (A)-domain

An A-domain consists of an N or V head and its arguments. The facts of coreference and the interpretation of empty categories also indicate that, in complex phrases and embedded sentences, a single domain can include embedded A-domains.

For example, V2s that are subcategorized by a verb constitute a sub-part of the A-domain formed by that verb, but adjunct V2s (and other adjuncts) which are not subcategorized, are independent. Thus, in Example 10A, shown immediately below, the entire sentence is made up of only one independent A-domain because the embedded V2 is subcategorized. However, in Example 10B, shown below, there are two independent A-domains because there are two nonsubcategorized A-domains. The A-domains in Example 10A and 10B are marked with square brackets. 'Independent'is defined in (11).

Example 10A. [John believes Sue saw Mary]

Example 10B. [John believes Sue] [because she saw Mary]

(11) Independent Item. An independent item is any non-subcategorized item.

5. Argument Types and Specifiers.

The present theory and inventive method makes the usual distinctions between arguments, complements, and adjuncts where arguments are X2 modifiers of heads; complements are subcategorized arguments; and adjuncts are optional arguments. The present theory and method also uses the terms 'specifier' and 'topic' as in other theories, but these terms need to be defined in terms of bottom-up structure. One term which is specific to the present theory is 'terminal argument' which refers to either the first or last required argument attached to a head. The definitions for specifier, topic, and terminal argument are presented in (12), below.

(12) A. Specifier: Any item attached to an X1 is a specifier.

B. Topic: A topic is a nontheta marked final N2 modifier.

C. Terminal Argument: A terminal argument is either the first or the last required argument (required arguments are either subcategorized or theta marked arguments) attached to an A-domain.

(12A) defines the term 'specifier'. As in other theories, a phrase can contain only one specifier, and this specifier must be in final position of the phrase. In terms of bottom up structure, this means that it is possible to attach one and only one specifier. Therefore, besides the absence of further items to be attached, the process of attachment is completed by the attachment of a specifier as described in (13).

(12B) provides the definition for the term "topic." It uses the expression, "final N2 modifier," which means the N2 is the last modifier attached to a string. Cleft sentences can be incorporated into (12B) by modifying the definition of 'topic' to include a nontheta marked N2 within a final argument where 'final' refers to the last argument to be attached. Sentence (i), immediately below, provides an example of a cleft sentence.

(i) It's these shoes that Bill must wear e

In sentence (i) the N2, these shoes, is a nontheta marked N2 within a final argument. Thus, interpretation of the empty category with that N2 is possible. We use the simpler definition in (12B) for ease of reference.

(13) The completion of the process of attachment. Attachment is 'completed' by the attachment of a specifier:

A) an X0 specifier (e.g. a D0) completes a phrase,

B) an X2 specifier (e.g. a possessive N2) completes an A-domain.

The sentences in (14) through (16) illustrate the effects of (13A). (13A) states that a phrase (an X2) is completed by the attachment of an X0 specifier. That is, any X0 which attaches to an X1 will complete a phrase, and no further items can be attached to such an item.

The effects of this on X2s (phrases) is illustrated in (14). Phrases completed by the attachment of a specifier can contain unsatisfied dependencies, as illustrated in (15) and they can serve as items in later attachments as illustrated in (16).

(14) A. [the big black dog]

B. *my [the big black dog]

C. *these [the big black dog]

(15) who did you see [the pictures of e ] ?

(16) I saw [the big black dog ]

(13B) states that the attachment of an X2 specifier creates a 'completed' A-domain. No other attachments can be made beyond that point, and no other argument can be added to that A-domain. This means that all further attachments to that phrase are impossible and arguments cannot be added to that A-domain. That is, arguments cannot be added to a completed A-domain either by attachment or by the interpretation of an empty category with an argument outside that completed A-domain.

In English, possessive N2s and nonsubcategorized wh words are attached at the X1 level to create a completed A-domain. It is important to note that subjects are not specifiers. They are attached to a V0 like any other argument (see (22Cvii) in Section 6). Therefore, they do not prevent the attachment of further arguments. Thus, the attachment of nonsubcategorized wh-words and the heads of possessives complete the process of attachment because they are attached at the X1 level, but subjects which are attached to V0s do not complete the process of attachment, as illustrated in (I).

(i) a. *what does who see e b. *pictures John's e c. what does Betty see e d. these mushrooms Betty might eat e (This is illustrated in (17) and (19)). Possessives are attached at the N1 level in order to account for the facts in (17).

(17) A. Mary saw John's new house

B. *Mary saw new John's house

C. *Mary saw the John's new house

D. *what did Mary see John's new e

E. *what did you see whose pictures of e

F. Bob's sister's house (17A) provides a sentence with an acceptable possessive N2 where the possessive is attached finally to the noun head. (17B) and (17C) illustrate that attachment cannot continue after the attachment of the possessive, and (17D) and (17E) illustrate that another argument also cannot be added to a completed A-domain by interpreting an e.c. with an N2 that is outside of it. That is, the attachment of the question word in (17D) and (17E) is unacceptable because an argument has been added to a completed A-domain by associating an e.c. with an e.c. internal to the completed A-domain. (15) above illustrates that, unlike a completed A-domain, a phrase completed by an X0 specifier (e.g. the D0) does not prevent interpretation of an empty category with an argument outside the completed X2.

(17F) seems to be a counter example to this principle in that it appears that the N2, Bob's, has been attached to an N2 that has already been completed by the attachment of the possessive sister's. Attachment of Bob's to sister's house as in (18A) is impossible because sister's is a possessive which attaches to an N1 and completes attachment. However, the sentence in (17F) can be formed by attaching Bob's to sister, and then attaching the possessive 's' to Bob's sister, as in (18B). (The arrows in the trees in (18) indicate the promotions that are necessary before attachment can take place.)

EXAMPLE (18)

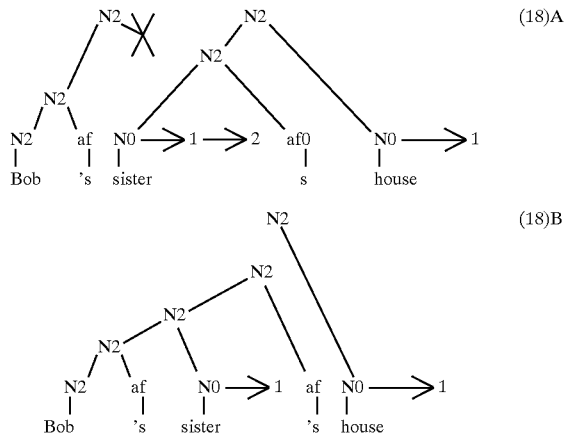

The facts of the distribution of nonsubcategorized wh words parallels that of possessive N2s, so it is necessary to attach these as specifiers as well. In general, wh words are attached to a verb by subcategorization frames, but a separate selection restriction is required to attach nonsubcategorized wh words. The selection restriction for nonsubcategorized wh words is given in (19). (20) provides sample sentences.

(19) A nonsubcategorized wh word is attached to the left of the VI it modifies.

(20) A. *what did who give Betty e
B. *who did what did John give e c
C. *why did who leave
D. *these mushrooms who might eat e?
E. *which books did John forget who wrote e?

Attaching an X2 at an X1 level completes an A-domain. Therefore, like the sentences in (18), the statements in (20) are unacceptable because arguments have been added to an A-domain after the attachment of the specifier. The selection restriction in (19) attaches the wh word as a specifier, and thus attachment cannot continue after that point. (13B) requires that no argument can be added to a completed A-domain. Thus, (20E) is unacceptable because a wh word is interpreted with an empty category in an A-domain that was completed by the attachment of a nonsubcategorized wh word. Other languages, such as Italian and Russian, do not parallel English in this regard in that they allow multiple wh words in certain circumstances. This would be the result of different selection restrictions. The interpretation of an e.c. from within a completed argument with an N2 outside that argument constitutes 'adding' an argument to that A-domain, which is precluded by (13B).

(12B) defines the term 'topic.' In this theory and inventive method, a topic is "a nontheta marked final argument attached to a head." Thus, a fronted wh word and a topic are included in this definition because they are both nontheta marked final N2s attached to a head. However, the head of a relative clause such as what in John knows [what he likes ] is not a topic because, even though it is a nontheta marked final argument, it is a head: it is not a modifier attached to a head as required by (12B). The importance of this distinction becomes clear in the discussion of the interpretation of e.c.s in Section 7.3.2.

(12C) presents the definition of 'terminal argument' a term specific to this theory and inventive method. Terminal arguments are the first and last required (subcategorize or theta marked) arguments attached to a head. For example, in the sentence, who did John give the book e in the restaurant, only the book and John are terminal arguments because they are the first and last required arguments to be attached. The question word, the empty category, and the object of the preposition are not terminal arguments. The N2, Bob's, in Bob's house, is a terminal argument because it is an argument (an X2 modifier) and it is the first argument attached to the head N.

6. Selectional restrictions.

This section presents a list of the lexical items and selection restrictions required for English. These lists are not meant to be exhaustive, but merely a representative sample. Example (21) provides a list of lexical items and (22) provides the selection restrictions.

(21) Lexical items.
A. −2: noncategory assigning affixes, and bound stems.
B. 0: Category assigning affixes, N0s, V0s, A0s, Adv0s, D0s, C0s (such as that and for) and P0s.
C. 2: Pronouns, empty categories, anaphors, wh words, and proper nouns. (The one empty category that is required in this method and theory is an N2, and it is represented by a lower case 'e.' Empty categories are not considered to be pronouns , they are equivalent to the referential expressions.)

Lexical entries for verbs, derivational affixes, and some nouns include specific subcategorization frames. Other categories utilize the categorial selection restrictions. Categorial selection restrictions are language specific statements that specify allowable attachments for categories, but subcategorizations are part of an items lexical entry and stipulate required arguments. Subcategorizations are required for not only verbs and affixes, but also for certain noun-plus-argument combinations such as, the professor of chemistry. In such cases the modifier cannot be separated from its head just as a subcategorized complement of a verb cannot be separated from its head because the selectional restrictions are stipulated in the lexical entry. That is, the subcategorization must be satisfied before other selectional restrictions are allowed to apply. This is illustrated in (i) presented immediately below.

(i) A. *a professor from England of chemistry

B *John put the car at 5 o'clock in the garage.

(22) Selection restrictions.

A. Subcategorizations.

Lexical items with complements, such as derivational affixes, verbs, and some nouns have subcategorizations which are specific to each. The item with the subcategorization requirement is the head.

In order for the subcategorization to be satisfied, the subcategorized arguments have to be attached first. If an item is attached to the head before its subcategorization is met, the subcategorization is violated. As stated in footnote 2 (presented after Example 29), this makes it impossible to include subjects as part of the subcategorization. That is, given this strict notion of bottom up theory, if subjects were included in the selectional restriction of a verb as in Categorial Grammars, it would be impossible to ever have VP internal optional arguments because the subject would mandatorily be attached before any optional arguments could be attached. The attachments specified in the subcategorizations must be made first in order to be met at all. Any attachment of an adjunct would interrupt or prevent the implementation of a subcategorization frame. If subcategorizations are allowed to be interrupted they become well formedness conditions that operate on completed strings in violation of the theory of bottom up structure.

B. Selectional restrictions for inflectional affixes.

The descriptions below are part of the definition of the categories and cannot be derived or predicted. The descriptions are based on the facts of distribution.

(i) A genitive –z is attached to the right of the [+genitive] N2 it modifies.

(ii) A plural –z is attached to the right of the regular [+plural] N2 it modifies.

(iii) A comparative –er is attached to the right of the [+comparative] A0 it modifies.

(iv) A superlative –est is attached to the right of the [+superlative] A0 it modifies.

(v) A third person –z is attached to the right of the third person present indicative of the regular verb it modifies.

C. Selectional restrictions for categories.

(i) A0s attach to the left of the N0s they modify.

(ii) A2s attach to the right of the N0s they modify.

(iii) N2s attach to the right of the P0s they modify.

(iv) P2s attach to the right of the N0s they modify.

(v) Genitive nouns attach to the left of the N1s they modify.

(vi) The complementizer, that, attaches to the left of the V2 that modifies it.

(vii) An X2 attaches to the V0 it modifies.

(viii) An auxiliary or modal verb attaches to the left of the V0 it modifies.

(ix) wh word is attached to the left of the [V1 it modifies.

The following is an expanded list of selection restrictions. Again, the list is not exhaustive and additional selection restrictions may be added.

Standard Selection Restrictions

A D0 to the left of an N1 creates an N2.

A P0 to the left of an N2 creates a P2.

An N2W to the left of a V2 creates an N2.

An N2W to the left of a V2[N2 creates and N2.

An S0 to the left of a V2 creates a V2.

An S0 to the left of a G2 creates a V2-.

An A0 to the left of an N0 creates an N0.

A P0 to the left of a P2 creates a P2.

An N2 to the left of a V0 creates a V2.

An N0 to the left of an N0 creates an N0.

An N0 to the left of an N0 creates a split*.

A B0 A0=A0.

An N0 to the left of a P2 creates and N0.

A C0 to the left of a V2 creates a C2.

An N2 to the left of an N1 creates an N1.

An N0 to the left of an N1 creates an N1.

An N0 to the left of a G1 creates a G2.

An N2 to the left of a G1 creates a G2.

A V2 to the left of a K0 creates a V2.

A K0 to the left of a V2 creates a V2.

A V2 to the left of a V2[K0 creates a V2.

A T0 to the left of a V2 creates a V2.

A V2 to the left of a T0 creates a V2.

A V2 to the left of a [V2[S0 creates a V2.

A V2[S0 to the left of a V2 creates a V2.

A V2 to the left of a V2[T0 creates a V2.

Selection Restriction for Verbs.

A modal attaches to the left of a simple form of the verb.

The helping verb "do" attaches to the left of a simple form of the verb.

The helping verb "be" attaches to the left of a past or present participle.

The helping verb "have" attaches to the left of a past participle.

Selection Restriction for Adverbs.

An adverb of class one attaches to the left of a verb.

An adverb of class two attaches to the left or right of a V2.

An adverb of class three attaches to the left or right of a V2 or to the left of a V0.

The selectional restriction in (Cvii) attaches arguments to verbs. This selection restriction does not specify either left or right attachment because either is acceptable. Embedded sentences and adjuncts are attached to a verb just as any other argument. All the attachments necessary to create the sentential complement must, of course, be completed before an embedded V2 can satisfy the subcategorization requirement of the verb that selects it.

7.1. Theta role assignment and interpretation.

Theta role assignment refers to the association of a theta role of a verb with an argument. Theta role requirements of verbs are specified in the dictionary entry for each verb in the theta grid. The theta grid specifies which theta roles are to be assigned and the positions to which they are assigned. Interpretation refers to the association of an empty category with an overt N2, so the empty category can have a referent. Empty categories are selected in those cases when an overt N2 is not available for attachment in a theta position. An empty category can be seen as a form of place holder for a theta role, and in the process of interpretation, the theta role is associated with an overt referent. In the present theory and inventive method, there is only one empty category, which is represented in a string by a lower case 'e.'

(23A) below, describes theta role assignment. Theta role assignment proceeds simultaneously with attachment. As the arguments of a verb are attached, theta roles must be assigned. If there is no overt N2 present for theta role assignment, an e.c. must be attached in the position that is assigned the theta role. The e.c. must later be interpreted with an overt N2, as described in (23B) or the sentence will fail.

(23B) below, describes the interpretation of e.c.s. Interpretation associates e.c.s with overt N2s. Interpretation is the last operation in the creation of a string. An e.c. must be interpreted with: 1) a nontheta marked final N2 (e.g. a topic, a fronted wh word, or the head of a relative clause), or 2) other N2s as in Control sentences. Note that (23Bi) must be tried first; if it can apply, it must apply. (23Bii) is tried next, if (23Bii) can apply it must. (23Bii) is limited to [-finite] A-domains. As stated in (23B), each independent (nonsubcategorized) A-domain must be interpreted individually. Interpretation begins when an independent A-domain is completed, or when a topic is attached. Interpretation begins with the most deeply embedded empty category and proceeds to the highest. 'Most deeply embedded empty category' refers to the e.c. that was the earliest to be attached to the head of an A-domain. For example, in the creation of (i) below, the most deeply embedded empty category is the e.c. farthest to the right because it was the first e.c. attached in constructing the V2: the infinitival complement must be formed before it can be attached to the matrix verb, and the first argument to be attached in the infinitival clause is the e.c. theme. However, in (ii), the most deeply embedded empty category is the one closest to the verb because it was attached to the head before the adjunct containing the other empty category.

(i) who does John want e to work for e (ii) What did John destroy e before e reading e

(23) Theta role assignment and interpretation.

A. Theta role assignment: All theta roles must be assigned as specified in the theta grid.

B. The interpretation of empty categories: After attachment is completed or a topic is attached, the empty categories of each independent A-domain are interpreted with available (An N2 is 'available' only if it has not already been interpreted with an e.c. from the same A-domain.) N2s as follows (The attachment of a topic forces interpretation: The topic must be interpreted with an e.c. that has the same smallest independent A-domain as it.):

(i) An e.c. is interpreted with a nontheta marked final N attached to its smallest independent A-domain.

(ii) ( In [-finite] A-domains) an e.c. is interpreted with the nearest theta marked N2.

Theta grid requirements in this theory and inventive method are absolute. If there is no overt N2 present for theta role assignment, an e.c. must be selected in that position or the sentence will fail. Thus, e.c.s are place holders for theta roles. E.C.s cannot be attached in positions that are not specified in theta grids, and they cannot be used if an overt item is present for theta role attachment.

Pied Piping and the Left Branch Condition are useful to illustrate the attachment of e.c.s. As described by (23A), (23A) e.c.s will only be attached when there is no overt N2 in a position that is assigned a theta role. The sentences in (i), immediately below, provide examples of the phenomena called 'Pied Piping.' The sentences in (ii), immediately below, illustrate the Left Branch Condition.

(i) a. This is the book which I have proofread the preface of e b. This is the book the preface of which I have proofread e.

In the sentences in (i), above, it is possible to have an e.c. replace either the object of the preposition 'of' as in (i(a)), or the entire object of the verb 'proofread' as in (i(b)). In this theory and inventive method, all P0s assign theta roles and the P0 of in this case, assigns a 'genitive' theta role. Unlike P0s, case markers such as possessive 's', do not assign theta roles. Thus, in (i(a)) and (i(b)), an e.c. can be selected instead of an overt N2 because the head is a theta role assigner. Later, (23B) will apply to provide the correct interpretation.

The Left Branching Condition describes the fact that an N2 constituent of a larger N2 can not be extracted. Examples are given in (ii).

(ii) a. You saw the president's wife's guard b. *whose did you see [N2 e wife's guard ]N2 c. *whose wife's did you see [N2 e guard ]N2.

d. whose wife's guard did you see.

The sentences in (iib) and (iic) are unacceptable because it is impossible to get an e.c. in those positions: (23A) states that e.c.s are selected only when there in no overt N2 present for theta role assignment. The possessives 'whose' and 'wife's' in (ii) are not theta marked arguments so e.c.s are not possible because e.c.s can only occur in theta marked positions.

The current theory and inventive method requires one statement for each of the processes that are governed by interpretation: 1) the interpretation of topics, fronted wh words, and the heads of relative clauses, and 2) the interpretation of N2s in Control type sentences. While the current theory and inventive method require two statements for the interpretation of e.c.s, the current method of interpretation is far less complicated than a theory that requires three types of empty category (e.g. trace, PRO, and pro) plus: lexical government, antecedent government, proper government, c-command, the empty category principle, and the other theoretical devices such a theory entails.

The next two sections described below provide demonstrations of theta role assignment of (23A) (section 7.2.), and the interpretation of empty categories of (23B) (Section 7.3.).

7.2. Theta role assignment of (23A).

Examples (24) and (25) illustrate theta role assignment in a sentence without any empty categories. (24) provides the theta grid for the ditransitive verb give, and (25) provides a sentence that conforms to that theta grid[1].

---

[1] The facts of Dative Shift indicate that there are two theta grids and two subcategorizations for ditransitive verbs, one which describes sentences such as (ia) and the other for sentences such as (ib).
(i) a. John gave Mary a book.
b. John gave a book to Mary.
Similarly, ergative variations of verbs such as those in (ii) entail an alternate theta grid.
(ii) a. John melted the ice
b. the ice melted

(24) give <agent, __theme, goal>

Example (24) specifies that a theme theta role is assigned to the right of the verb and a goal follows. The agent theta role is assigned to an N2 to the left of the verb. Example (25) provides a tree in which theta role assignment has proceeds in an ordinary manner. The empty '<>' grid on the uppermost V2 illustrates that all theta roles have been assigned.

EXAMPLE (25)

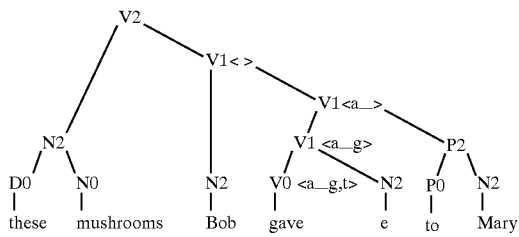

Sentence (26) provides an example of the same sentence with an empty category. The theta grid is exhausted on the V1 that dominates Bob gave e to Mary, therefore, there is no theta grid after that point.

EXAMPLE (26)

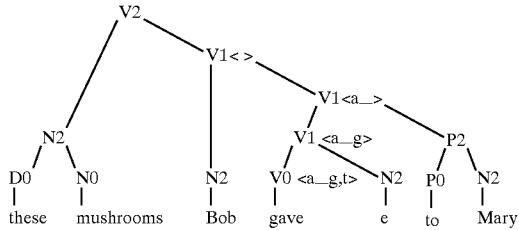

In sentence of Example (26), the theta grid of (24) would not be satisfied if the empty category were not placed in the theme position of the sentence. The N2, these mushrooms, does not receive a theta role, and therefore must be interpreted. The interpretation of empty categories is presented in the following section (Section 7.3). Sentence (27) provides an example of a passive sentence of a transitive verb.

(27) The criminal was arrested (by the police).

In a passive construction, the past participle of a transitive verb appears with the verb 'be,' and a theme theta role is assigned to the N2 in subject position and an agent theta role is not assigned. However, an agent can optionally appear as the object of a 'by phrase.' In this theory and inventive method, it is assumed that the past participle which is used for passive constructions does not assign theta roles unlike other forms of the verb. A passive construction is formed by attaching the past participle to the verb 'be' like an adjective. The verb 'be' as a main verb always assigns a theme theta role to its right. Thus, in passive sentences, the subject always has a theme theta role[2].

[2] Intransitive verbs cannot serve as adjectives in passives because they cannot serve as adjectives in any situation as illustrated in (i).
(i) A. *the slept man
B. *the man was slept
C. *the happened accident
D. *the accident was happened In a question formed by the attachment of a wh word in subject position, subcategorization frames and theta grids are satisfied with normal word order: neither interpretation nor empty categories are required as illustrated in (29).

EXAMPLE (29)

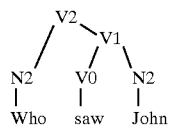

In those cases in which a nonsubject wh word is attached, there must be an empty category in the sentence in order for the wh word to be associated with a theta role by interpretation as in (30).

EXAMPLE (30)

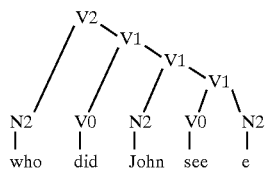

The assignment of theta roles in (30) proceeds as follows: the theme theta role of the verb is assigned to the empty category and the agent is assigned to John. The wh word is attached without a theta role and must be associated with an empty category through interpretation by (23B). Until interpretation applies, the wh word is a nontheta marked N2. The following section provides a description of the operation of (23B) beginning with the e.c. in sentence (30). A sentence like (31) is impossible because the topic has not been interpreted. The attachment of a topic forces interpretation, and interpretation must apply. If no theta role were assigned as the object of see, the sentence would fail because the wh word could not receive an interpretation.

7.3.1. The Interpretation of empty categories of (23B).

In this section examples of the interpretation of empty categories of (23B) are presented beginning with a discussion of (23Bi). (23Bi) accounts for the interpretation of topics, fronted wh words, Cleft sentences, relative clauses (including Pseudo-clefts), and Parasitic Gap sentences. (23Bi) associates e.c.s with nontheta marked final N2s (topics and the heads of relative clauses). (23Bii) accounts for the interpretation of e.c.s in Control sentences. A discussion of (23Bii) follows in section 7.3.3.

7.3.2. The interpretation of empty categories of (23Bi).

As stated in (23B), interpretation begins when all attachment is completed or when a topic is attached; each independent A-domain is interpreted individually. The lowest e.c. in an independent A-domain is interpreted first, and (23Bi) is tried first. (23Bi) states that an e.c. can be interpreted with a topic.

The e.c. of sentence (30) is interpreted as follows. After attachment is completed, (23B) is tried. (23Bi) must be tried first. It can, and therefore, must apply in this case to associate the e.c. with the topic: (23Bi) can apply in this case because the topic is a nontheta marked final N2 attached to[3] the smallest independent A-domain of the e.c. The process of interpretation associates the nontheta marked final N2 with a theta role, and the e.c. with a referent. (31) provides a sentence in which a fronted wh word (a nontheta marked final N2) is interpreted with the theta role of an e.c. in an embedded sentence. (23Bi) is tried first, and it can and must apply because there is a topic attached to the independent A-domain of the e.c. The entire sentence is the independent A-domain of the e.c. because the embedded V2s are subcategorize. Thus, they are not independent and cannot be interpreted individually.

[3] 'Attached to' is used instead of 'in' to recognize that (23Bi) can interpret an e.c. with an N2 within the A-domain of an e.c. as with topics or with an N2 adjacent to the A-domain of the e.c. as with a relative clause. The interpretation of e.c.s with the heads of relative clauses and the structure of relative clauses is discussed later in this section.

EXAMPLE (31)

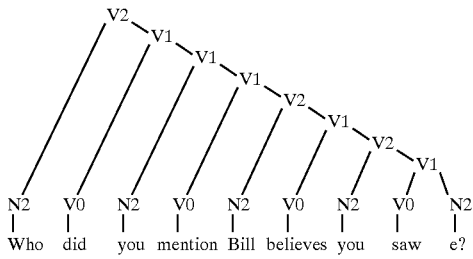

Who did you mention Bill believes you saw e?

Topicalized sentences such as (32) are interpreted in a similar manner by (23Bi).

EXAMPLE (32)

These mushrooms, I think Betty might eat e.

The theme theta role of the embedded verb in (32) is assigned to the e.c., and these mushrooms, is a nontheta marked final N2 attached to the A-domain of the e.c. The embedded V2 is a subcategorized A-domain, so it is not independent. Since there is a nontheta marked final N2 attached to the independent A-domain of the e.c., (23Bi) can and must apply in this sentence.

The sentences in (33) illustrate that a topicalized sentence cannot appear as an embedded argument of another verb.

EXAMPLE (33)

A. *John knows [that the ball Mary threw e]
B. *John knows [what did Bob see e]

The sentences in (33) are unacceptable because, as stipulated in (23B), the attachment of a topic to a V0 triggers interpretation and the end of attachment. That is, the attachment of ball, to Mary threw e and the attachment of who in (33B) triggers interpretation and no further attachment can take place. Thus, the attachment of the V2 as an argument of the higher verb is not possible. Fronted wh words as in (33B) qualify as topics because they are nontheta marked final N2s attached to a head as required by (14B).

Relative clauses such as those in (34) are superficially similar to the sentences in (33), but such sentences are acceptable because the head of a relative clause is not a topic (a nontheta marked final N2 attached to a head). Since the head of a relative clause is not a topic, the formation of a relative clause does not trigger interpretation.

EXAMPLE (34)

A. the students who are university employees can leave early. (restrictive interpretation)
B. the students, who are university employees, can leave early. (nonrestrictive interpretation)
C. the students, university employees, can leave early.
D. the tall students can leave early
E. the student Bob likes e can leave early The structure of a relative clause requires some clarification. As illustrated in (35), the distribution of relative clauses parallels N2s and not V2s.

EXAMPLE (35)

A. *John likes Bill went to school
B. John likes what Bill did e
C. John likes T.V. because of the movies Mary likes e
D. John likes the school in which he works That is, a relative clause can serve as object of a verb that does not allow V2 complements as illustrated in (35A) and (35B). Also, an N2 and a relative clause can serve as an object of a preposition as in (35C) and (35D) but a V2 cannot. Thus, a relative clause is an N2, not a V2. Accordingly, the head of the attachment that forms the relative clause must be an N (as stated in section 1 the head of an attachment contributes the category and lexical features to the item that results from the attachment). Since relative clauses and appositives are formed by modifying nouns with V2s (or another N2 as in (34C), it is necessary to conclude that the resulting structures are N2s, not V2s.

A relative clause is formed in English by modifying a noun with a V2. For example, the relative clause in (34A) is formed by modifying the N0, students with the V2 who finished the test. Since the head, students, is an N0, the item formed by this attachment is also an N0. After attachment is completed, Promotion will convert the N0 to an N2.

Examples (34B) and (34C) are similar to (34A), but in these cases the V2 modifies an N2 to form a nonrestrictive relative clause in (34B) and an appositive in (34C). The heads of these attachments are N2s, so the resulting structures are also N2s. The difference between the restrictive relative clause in (34A) and the nonrestrictive relative clause in (34B) is that the former involves the modification of an N0 and the latter involves the modification of an N2.

Obviously, the heads of relative clauses do not qualify as topics since they are heads not modifiers. Therefore, unlike the formation of sentences with topics, the formation of relative clauses does not trigger interpretation. However, in (23Bi), the interpretation statement that interprets e.c.s with topics, can apply to interpret e.c.s with the heads of relative clauses because the heads of relative clauses are nontheta marked Ns attached to the independent A-domain of an e.c.

Since the formation of a relative clause does not theta mark the V2 that modifies the N2 head, the V2 in a relative clause is an independent A-domain. Interpretation of the head of the relative with an e.c. within the V2 that modifies it is possible because the head is a 'nontheta marked N attached to its A-domain' as required by (23Bi)[4]. The relative clause itself may or may not be theta marked., but the N2 head of a relative clause is a nontheta marked final N2, so (23Bi) can apply. (23Bi) is not written for topics; it is written for nontheta marked final Ns, so it can interpret an e.c. with a topic (a nontheta marked final N2 attached to a head) and with the heads of relative clauses, which are also nontheta marked Ns.

[4] In a relative clause such as (34) the independent A-domain of the e.c. is the V2 that contains the e.c. The head of the relative clause is outside of that A-domain. (23Bi) does not require that the nontheta marked N2 be 'inside' the A-domain of the e.c. it interprets; it simply requires that the nontheta marked N2 be 'attached to' the A-domain of the e.c. The head of a relative clause is attached to the A-domain of the e.c. as required by (23Bi), so interpretation is possible.

To illustrate the difference between relative clauses and topicalized sentences, Example (36) provides two morphologically identical sentences with different syntactic structures: one is a topicalized sentence and the other is a relative clause. (36A), the relative clause construction, is acceptable, but (36B), the topicalized V2 construction, is unacceptable.

EXAMPLE (36)

A. I like [N2 the man [V2 Bill saw c]V2]N2
B. I like [V2 the man Bill saw e]V2

The attachment of the topic in (36B) triggers interpretation and prevents the attachment of the embedded V2 to the verb like. However, in (36A), the nontheta marked final N2 is the head of a relative clause; it is not a topic. Thus, interpretation is not triggered and attachment can continue. After all attachment is completed the head of the relative clause will be interpreted with the e.c. by (23Bi).

EXAMPLE (37)

*John left Bill e complaining about e

Sentence (37) is unacceptable because the attachment of Bill to complaining about constitutes the attachment of a topic which triggers interpretation and prevents all further attachment.

Pseudo-cleft sentences, which involve relative clauses in subject position, such as (38) are interpreted in the same way as the relative clause in (36). That is, the attachment of the wh word head of the relative clause to the V2, John saw e, does not trigger interpretation, so the relative clause can be attached to the verb. After the completion of the entire sentence, interpretation can begin. The subject (a nonsubcategorized argument) is an independent A-domain, so it can be interpreted[5]. (23Bi) can apply to the subject to interpret the wh word with the e.c. because there is a nontheta marked final N2 attached to the A-domain of the e.c. The A-domain of the e.c. is the V2, John saw e. If the N2, what, were attached to the V0 as an argument (as is the case with topics) attachment would have to stop.

[5] The subject will not be interpreted until all attachment is completed or a topic is attached. It cannot be interpreted before it is attached to the main verb because interpretation follows the end of all attachment.

EXAMPLE (38)

[what John saw e] was a book

The examples in (39) and (40) are interpreted in a manner similar to Pseudo-Cleft sentences because these also involve relative clauses in subject position.

EXAMPLE (39)

[the hope which spring promises e] is elusive

EXAMPLE (40)

[the man e to talk to e] is Bob]V2

In sentences (39) and (40), the final N is a head of a relative clause. Such attachment does not trigger interpretation, so attachment is not interrupted. Thus, the relative clause can be attached to the verb.

Pseudo-cleft sentences and the sentences in (39) and (40) which involve the interpretation of an N2 in subject position by (23Bi), contrast with the sentences in (41) in which the interpretation of an e.c. internal to a subject is impossible.

(23) predicts the acceptability facts for the sentences in (41) which involve the attachment of a topic to a V0 after the attachment of the subject; that is, in these sentences the nontheta marked final N2 is a topic; it is not the head of a relative clause. It is not possible to attach a topic directly to the subject in (41) because the attachment of a topic would trigger interpretation. As stated above, Pseudo-cleft sentences and other relative clauses in subject position are not precluded because, in Pseudo-cleft sentences, the head of a relative clause is not a topic, and interpretation is not triggered.

EXAMPLE (41)

A. who did e embarrass Bob? (emphatic use of did)
B. *who did [pictures of e] embarrass Bob?
C. what did John think e would embarrass Bob
D. *who did John think [pictures of e] would embarrass Bob
E. [linguistics for you to give up e] would be a shame Sentences (41A) and (41C) illustrate that an e.c. in subject position can be interpreted with a topic attached to the main verb. (41B), (41D), and (41E) illustrate that an e.c. contained within a subject cannot be interpreted with a topic.

In (41A) and (41C), the smallest independent A-domain of the e.c. is the entire V2. The e.c. is itself a nonsubcategorized N2, but it is not composed of a noun head with arguments, so it does not constitute an A-domain. The smallest independent A-domain of the e.c. is the entire V2, and this V2 has a nontheta marked final N2 attached to it, so (23Bi) can be applied. However, in (41B), (41D), and (41E) the smallest independent A-domain is not the entire V2. Rather, the independent A-domain of the e.c. in these sentences is the subject because the e.c. is an argument of the noun head of the subject[6]. The subject is not subcategorize, so it is an independent A-domain. The topic in (41B), (41D), and (41E) is not attached to the independent A-domain of the e.c. as required by (23B), so interpretation is not possible.

[6] The P2, of e ,is an argument of the N0, pictures, in the same way that the P2, with long hair, is an argument of students in students with long hair. In this theory and inventive method, any X2 modifier of a head is an argument of that head.

The statement in (23) also predicts that other nonsubcategorized arguments will allow a bare e.c. to be interpreted with a topic but will not allow an e.c. within a nonsubcategorized argument to be interpreted with a topic because in the former situation the independent A-domain of the e.c. is the entire V2, but in the latter, the independent A-domain of the e.c. is the nonsubcategorized argument. The sentences in (42) illustrate that this is correct.

EXAMPLE (42)

A. who did John see Mary with e?
B. *who did John see Mary with pictures of e?
C. what did John break the window with e?
D. *what did John break the window with a piece of e?
E. *John broke the window with what a piece of e?

In (42A) the e.c. object of the preposition needs to be interpreted. (23) states that an e.c. must be interpreted in its smallest independent A-domain. The preposition is the head of the e.c. However, according to (9) the P does not constitute an A-domain because the P0 is not a noun or a verb. The head to which the P is attached is the verb 'see.' The attachment of the P and other arguments to the verb does constitute an A-domain, and this A-domain is not subcategorized, so the smallest independent A-domain of the e.c. in (42A) is that of the verb 'see.' There is a nontheta marked N2 attached to that A-domain, so (23Bi) can and must apply.

In (42B) the A-domain of the e.c. is not the P0, 'of' because the attachment of an argument to a P0 does not form an A-domain. However, the attachment of the P, 'of e.c.' to the noun head 'pictures' does create an A-domain. The P0 'with' does not subcategorize[7] 'pictures of

[7] N2s are attached to P0s by the selection restriction in (I). There is no need for a subcategorization frame. (I) An N2 is attached to the right of the P0 it modifies. e' so 'pictures of e' is independent. Therefore, the smallest independent A-domain of the e.c. in (42B) is the N2, 'pictures of e.' This A-domain does not contain a topic, so interpretation by (23) is impossible.

Thus, in sentences (42A) and (42C), interpretation is possible because the smallest independent A-domain of the e.c. is the entire V2 and that V2 has a nontheta marked final N2 attached to it. (42B) and (42D) are unacceptable because the smallest independent A-domain of the e.c. is the object of the P0, which does not contain a nontheta marked final N2.

Parasitic Gap sentences are also explained by the operation of (23Bi). Example (43) provides typical Parasitic Gap sentences in which an adjunct clause contains a gap that corresponds to another gap in a higher sentence.

EXAMPLE (43)

A. [V2 [V2 which books did you destroy e̲]V2 [P without e reading e̲]P]V2

B. [V2 [V [N2 John, who we talked to e̲]N2 [V2 because we liked e̲]V2 ]V2 V2]

The acceptability of the sentences in (43) depends on the double gap construction as illustrated by the unacceptableness of the sentences in (44) which contain only a single gap.

EXAMPLE (44)

A. *which books did you destroy the books/the house without e reading e?
B. *John who we talked to John/Fred because we liked e
C. *you destroyed the books without e reading e There are two structures that might be used to describe the facts of Parasitic Gap sentences. The first is one in which the topic is attached to the main verb before attaching the adjunct clause as in (45). The second is one in which the topic is attached to the sentence after the attachment of the adjunct clause as in (46). However, only sentence (46) results in an acceptable sentence.

EXAMPLE (45)

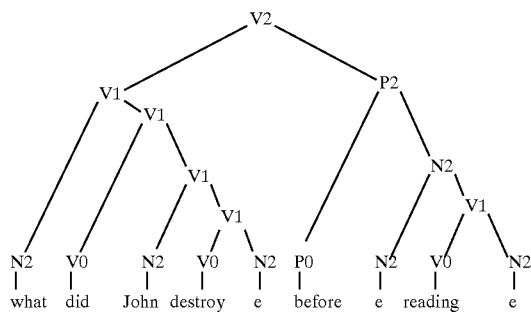

EXAMPLE (46)

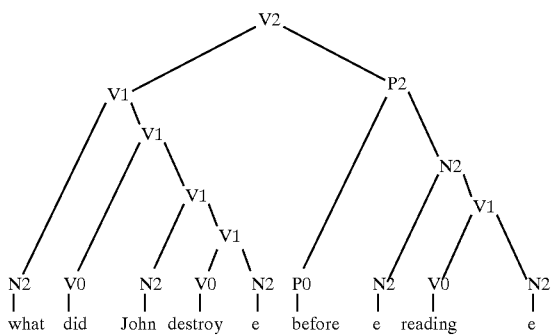

The sentence in (45) is unacceptable because attachment has continued after the attachment of the topic in violation of (23B). That is, the adjunct is attached after the attachment of the topic, which prevents all further attachment.

Sentence (46), which provides the tree for (43A), is acceptable and is interpreted as follows: the first e.c. to be interpreted is the object of the main clause. This e.c. is interpreted first because it was the first attached. The adjunct is attached after the main clause is constructed, thus the e.c. in the main clause must have been attached first. It is interpreted with the topic by (23Bi). The next e.c. to be interpreted is the object of the adjunct clause. It is also interpreted with the topic by (23Bi)[8]. The agent of the adjunct is interpreted last. The agent e.c. cannot be interpreted with the topic by (23Bi). (23B) which requires that all e.c.s within an A-domain be interpreted with available N2s. An N2 is available if it has not already been interpreted with an e.c. in the same A-domain.

[8] The possibility of interpreting more than one e.c. with one final N2 does not occur except with nonsubcategorized clauses because (23) requires that all e.c.s within an A-domain must be interpreted with distinct N2s. Thus, the sentence in (i) does not allow more than one e.c. to be interpreted with the wh word because the e.c.s are all within the same A-domain.
(i) *who did John think e believes saw e The sentence in (43B) is interpreted in a similar manner. The e.c. object of the adjective clause is interpreted with who by (23Bi), and the e.c. object of liked is also interpreted with who by (23Bi). The interpretation of the two e.c.s with the relative pronoun is possible because each e.c. is in a different independent A-domain: the independent A-domain of the object of talked to is we talked to e; the independent A-domain of the e.c. object of liked is because we liked e.

Sentences in (44A) and (44B) are unacceptable because the topic is not attached to the independent A-domain of its head, as required in Section 4 where, in the discussion of Example (12), it is stated that a nonrequired modifier can be displaced form its head, only if it is attached to the independent A-domain of its head. (44C) is unacceptable because the only interpretation of the e.c. that is possible is semantically anomalous. Specifically, the lowest e.c., the theme of reading, is interpreted with the subject of the main verb rather than with the object because it is the nearest. The distance between an e.c. and the 'nearest' available N2 is measured by counting nodes of the tree. It is not measured by looking at proximity within the phonological representation. Example (47) provides the tree for (43C) to illustrate this.

EXAMPLE (47)

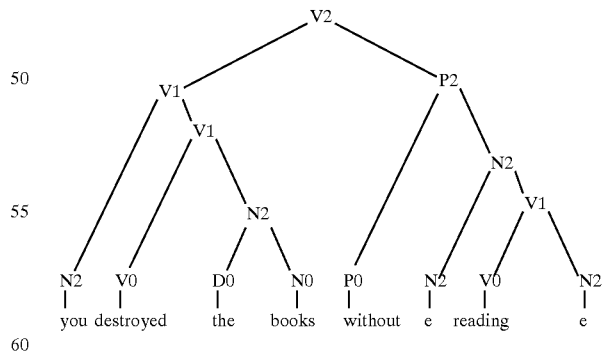

By following the nodes of the tree along the path of attachment, it is clear that the subject of the main clause which is separated from the e.c. by five nodes is closer than the object which is separated from the e.c. by seven nodes.

The second e.c., the agent of reading, is interpreted with the theme of the main verb resulting in a semantically anomalous sentence in which the subject of the adjunct and the object of the adjunct are both the books: the anomaly being that the N2, the books, is both the agent doing the 'reading' and the object 'being read.' It is not possible to interpret the theme of reading with books and the agent with you because that would require that the agent be interpreted first, which violates the order of interpretation stipulated in (23B).

Counting nodes to determine which N2 is the closest to an e.c. for the purposes of interpretation predicts that a single e.c. in an adjunct clause should be interpreted with the subject of the main clause. The sentences in (48) illustrate that this is correct: the e.c. subject of the adjunct clauses in (48) are interpreted with the subject of the main clause.

EXAMPLE (48)

A. John destroyed the books without e reading them

B. John destroyed the books before e coming.

The sentence in (49), however, also involves e.c.s in different independent A-domains[9], but interpretation is not possible.

[9] In cases such as (i) below, the unacceptability of an adjunct clause is caused by the subordinate conjunction that is chosen. In sentence (i), the subordinate conjunction because requires an overt subject for attachment. (See Section 8 for discussion of the IDC which details this sort of selective attachment.)
(i) *which books did John destroy because e reading e

EXAMPLE (49)

*which books did you put back e into the box which contained e?

Example (49) is unacceptable because the e.c. is contained within a V2 that has a wh word attached as a specifier. As stated in (14B), the attachment of a wh word as a specifier completes an A-domain, therefore no further arguments can be added to that A-domain by either attachment or interpretation. Accordingly, the interpretation of the e.c. with which hooks is impossible[10].

[10] Sentences such as those in (i) are unacceptable because they involve empty categories within a subject. See for a discussion.
(i) A. Alex, who friends of e like
B. who did e meeting e surprise you 7.3.3. The interpretation of empty categories of (23Bii).

(23Bii) provides the interpretation of e.c.s in Control sentences. (23Bii) states that, in [-finite] V2s[11], an e.c. must be interpreted with the nearest theta marked N2. The sentences in (52) provide examples of this phenomena.

[11] The example in (i) indicates that Control-type interpretation is limited to [-finite] V2s. (ia) and (ib) are identical but interpretation of the e.c. is only possible in (ia) which involves an infinitival complement.
(i) a. John told someone e to work for him
b. *John thinks e works for him

EXAMPLE (52)

A. John needs someone e to work for him

B. John needs someone e to work for e

What needs to be explained in these sentences is that, in (52A) someone is interpreted with the e.c. agent of the embedded sentence, while in (52B) someone is interpreted with the e.c. theme of the preposition of the embedded sentence, and the agent of the embedded sentence is interpreted with John. According to (23Bii), the e.c. in (52A) is interpreted with someone because someone is the nearest nontheta marked final N2. (23Bi) cannot apply because there is no nontheta marked final N2. In (52B) there are two e.c.s to be interpreted. As specified in Section 7, the lowest e.c. must be interpreted first, and thus the e.c. object of for is interpreted with the nearest terminal N2 which is someone. The e.c. in the subject position of (52B) is interpreted next.

It cannot be interpreted with someone because someone is not an available N2. That is, it has already been interpreted with an e.c. from the same A-domain. However, (23Bii) can apply to associate the e.c. with the subject of the main verb.

Tough Movement sentences, made famous in earlier works by Chomsky and other linguists, can also be accounted for by (23Bii) without difficulty. Examples of Tough Movement sentences are provided in (53A) and (53B). Tough Movement refers to those adjectives which allow sentential complements as in (53A), and which also allow a pleonastic in subject position of the matrix sentence as in (53B).

EXAMPLE (53)

A. It is tough e to please John.

B. John is tough e to please e.

Theta role assignment in example (53) proceeds as follow. The verb please has an agent theta role and a theme theta role to assign. In (53A) the theme theta role is assigned to John and the agent is assigned to the e.c. The e.c. is interpreted by (23Bii) because (23Bi) cannot apply. In sentence (53B), however, the theme theta role of please is assigned to the empty category and John is in the agent position of the higher sentence. (23Bi) cannot apply to interpret the lowest e.c. because there is no nontheta marked N2, but (23Bii) will interpret it with John. The second e.c. will be interpreted arbitrarily.

(54A) and (54B) demonstrate that not all adjectives that allow sentential subjects also allow pleonastic subjects. This is a result of a difference in the lexical entry, so (54A) and (54B) are not considered within this discussion of the structure of Tough Movement.

EXAMPLE (54)

A. John is eager to please

B. *It is eager to please John

The fact that adjectives like those in (54) do not act like Tough Movement sentences is the result of the fact that there are two classes of adjectives in these sentences: the first type, the Tough Movement type, which can be called endothematic adjectives involve theta roles that are predicated of t h e subject. However, the second type of adjective, those that pattern like eager, can be called exothematic because they involve theta roles that are predicated outside the subject.

8. The Immediate dominance condition.

Both the "That Trace Effect" and the variable presence of subjects in infinitival clauses can be explained by allowing the selection restrictions of those items to refer to the category they require plus the categories they immediately dominate as specified by the Immediate Dominance Condition (IDC). Th e IDC allows the subcategorization of an item to refer to the item selected and to the categories immediately dominated by that item. This principle is merely a revised version of the independently required condition on th e morphological principle of locality[12], and thus results in no extra cost to the grammar. The IDC is presented in (55).

[12] In morphology, the principle of locality restricts access to word internal information. Specifically, the strict version of locality in morphology states that no rule has access to the internal structure of the words they affect. Conditions on the principle of locality such as the Atom Condition of Williams (1981) and the Adjacency Condition of Siegel (1971) allow rules limited access to the internal structure of words. The Immediate Dominance Condition is proposed as an alternative to these earlier conditions.

(55) The Immediate dominance condition.

A selectional restriction can refer to the lexical category for which it selects plus the nodes immediately dominated by that category. For example, the That Trace Effect results from the fact that the complementizer that cannot attach to a sentence that does not have an overt subject. That Trace Effect sentences are illustrated in (56) and (57). The subcategorization frame for that is given in (58).

EXAMPLE (56)

A. who do you think Bill saw
B. who do you think that Bill saw

EXAMPLE (57)

A. who do you think saw Bill
B. *who do you think that saw Bill

EXAMPLE (58)

that __[V2 [N2
[+overt]

The subcategorization presented in Examples (58) states that the complementizer that can only be attached to a V2 if the latter has an overt N2 in subject position. By adding this selectional restriction to the lexical entry for the complementizer, that, it is possible to predict that sentences like (57B) are unacceptable. In (57B), that is attached to a V2 that does not immediately dominate an overt N2 in violation of (58).

There is a second that in English which parallels a relative pronoun in distribution which attaches V2s to nouns as in (59).

EXAMPLE (59)

The man that saw Bill is standing over there.

As sentence (59) illustrates, the that attached as the N2 head of adjective clauses does not discriminate between sentences with or without overt subjects, so the subcategorization simply does not include the feature that specifies that the N2 must be an overt N2.

EXAMPLE (60)

Nos cuetan que (ella) quiere que la merezcas

As illustrated in (60) Spanish que has no such restriction and can attach whether or not a sentence has an overt complementizer (Maria-Luisa Rivero, 'On left-dislocation and topicalization in Spanish.', Linguistic Inquiry 11:363–393. 1989). Thus, it seems that the distribution of complementizers varies both within languages and across languages.

As illustrated in the sentences in (61), the complementizerfor has a similar restriction which can also be accounted for within its subcategorization frame using the IDC.

EXAMPLE (61)

A. John preferred for Bill to read the book.
B. *Who did John prefer for to read the book.
C. for [__[V2 [N2]

The variable presence of subjects in infinitival phrases can also be explained using the IDC. That is, when a verb selects an infinitival complement there is variation as to whether or not an overt subject is allowed. Verbs like want optionally allow an overt subject in the infinitival complement; verbs like try disallow an overt subject in the infinitival complement; and verbs like believe require an overt subject in the infinitival complement. A verb like persuade requires an object followed by an infinitival complement that does not contain an overt subject. These facts are presented in (62).

EXAMPLE (62)

A. I want John to win
B. I want to win
C. I tried to win
D. *I tried John to win
E. I believe John to have won
F. *I believe to have won
G. I persuaded John to win
H. *I persuaded John Bob to win As described herein, it is argued that these facts are best handled in a manner similar to the explanation for the That Trace Effect using the IDC. Specifically, it is possible to describe the facts of the different types of English verbs by allowing the subcategorization frames of those verbs to specify whether or not a complement allows an overt subject. A verb can subcategorize for a C2 or a V2. When a verb of the believe-type subcategorizes for a complement clause, it specifies that this clause must contain an overt subject. Verbs of the want-type subcategorize for either a for-infinitival with an overt subject or a V2 without an overt subject: verbs of the try-type subcategorize for a V2 and do not allow an overt subject. The subcategorizations of these verbs are presented in (63)

EXAMPLE (63)

```
          [N2
A. try    [__[V2 [N2 ([−overt])
          [N2
B. believe [__[V2 [N2
          [V2
C. want   [__[N2
              [V2 [N2 ([−overt])
              [C2
              [N2
D. persuade [__ [N2, [V2 [N2 ([−overt])
```

Sentences such as those in (64) indicate that the first interpretation statement needs to be modified slightly. Specifically, the first interpretation statement needs to be written in terms of nonsubcategorized e.c.s where a nonsubcategorized e.c. is one which is not mentioned in a subcategorization frame.

EXAMPLE (64)

A. John tried e to go.
B. *who did John try to go?
C. John told the police e to take it.
D. *who did John tell the police e to take it?
E. who did you say e told the police e to take it?
F. John told the police Bob took it.
G. *who did John tell the police e took it?
H. Did you say Bob told the police e to take it?
I. *who did you say Bob told the police e take it?
J. *who did you say e told the police e took it?
K. *Did you say John told the police e take it?
L. who did you say John believed e took it?
M. who believed John took it?

It is possible to predict these facts by restricting the first interpretation statement (23) to nonsubcategorized e.c.s where 'nobsubcategorized e.c.' means an e.c. that is not specifically mentioned in a subcategorization frame. Thus, if a subcategorization frame of a verb specifically mentions an e.c. (a [-overt] N2), that c.c. is not available for interpretation by (23). The subcategorization frames of the verbs 'try' and 'try' are good examples of this phenomena. These subcategorization frames are given in (63). The new version of the interpretation statement is given in (65).

(65) Iterpretation.

A) An e.c. is interpreted with a nonthetamarked final N attached to its smallest independent A-domain.

B) (infinite A-domains) an e.c. is interpreted with the nearest theta marked N2.

With verbs like 'try' or 'want,' the e.c. subject of the infinitival clause is clearly specified in the subcategorization frame; therefor, interpretation by (65A) is impossible. This predicts that (64B and 64D) are unacceptable because the subcategorize e.c.s are being interpreted with the fronted N2. In (63H) the e.c. is interpreted with (65B) without a problem. (63F–63J) illustrates the facts for verbs like tell. As these examples illustrate, it is not possible to have an e.c. subject if the complement clause is finite, but there must be an e.c. if the clause is not finite. (64J and 64K) illustrate that this verb must have an overt subject in all cases when there is a finite clause. Thus, the subcategorization for the verb tell (given in (66)) indicates that the verb tell has different requirements for finite and infinite clauses.

EXAMPLE (66)

tell [___N2, [V2 [N2
　　　　　[+inf [+overt
　　　　N2, [V2 [N2
　　　　　[-fin [-overt 9.1. Anaphoric reference.

The facts of coreference can be accounted for in this theory and inventive method with one statement for the coindexing requirements for each of: 1) reflexives and reciprocals, 2) pronouns, 3) possessive pronouns, and 4) R-expressions[13]. These four statements are presented in (67). The coindexing requirements presented in (67) may at first appear slightly more complicated than the binding conditions of GB theory. However, they do not require binding, government, c-command, barriers, specified subjects, or any other such miscellaneous principles or subcomponents to provide a cogent account of the data, and are, therefore, considerably simpler.

[13] An R-expression in this theory and inventive method is a referential item such as a noun or a proper noun. An e.c. interpreted with an N2 becomes identical to that N2, and thus becomes equal to an r-expression by interpretation. For the purposes of coindexing an interpreted r-expression is equivalent to an r-expression.

(67) Coindexing Restrictions.

A. Reflexives and reciprocals (r/rs).

An r/r must corefer with a terminal argument in the smallest A-domain that contains it and (if available) a higher terminal.

B. Pronouns.

A pronoun cannot corefer with a coargument (where coargument means an argument of the same head) in the same A-domain.

C. Possessives.

A possessive cannot corefer with nonterminal arguments or N2s in nonterminal arguments.

D. R-expressions[14].

[14] R-expressions in this theory and inventive method include interpreted e.c.s. The e.c. itself of course is not an r-expression, but the process of interpretation gives the e.c. all the features of its referent, so the e.c. must be treated as if it were the N2 with which it is interpreted; thus, for the purposes of coreference, and e.c. is a R-expression.

A R-expression must be free in its smallest independent argument.

9.2. Reflexives and reciprocals.

In this section, a discussion is presented of the coindexing facts of reflexives and reciprocals as described in (67A). (67A) is illustrated in sentences (68) through (79).

Example (68): John1 likes himself1
Example (69): John1 showed Mary2 herself2
Example (70): *John1 showed herself2 Mary2
Example (71): John1 thought that Fred2 showed Bill3 pictures of himself *1/2/3.
Example (72): John1 likes Bobs2 pictures of himself 2/*1.
Example (73): They1 thought that the pictures of them1 / themselves1 confused Bob.
Example (74): John1 thinks that rumors about him1 / himself1 have been spreading.
Example (75): Pictures of themselves embarassed the students.
Example (76): *John's1 mother hates himself1
Example (77): John1 told Bob2 that pictures of himself1/2 were available.
Example (78): John1 told Bob2 e to take pictures of himself*1/2.
Example (79): It was Bob2 John1 wanted e to take pictures of himself*1/2.

Sentence (68) is acceptable because the anaphor, himself, is coindexed with a terminal argument (the subject) as stipulated by (67A).

Sentences (69) and (70) present examples of double object sentences. Barss and Lasnik argue that it is impossible to arrive at an account of the coreference facts in double object clauses without the notion of precedence in any theory that uses c-command to define domains. (1986 LI Squib) The present therory and inventive method does not need to resort to the notion of precedence to account for double object asymmetries because it is does not use c-command. In fact, the principle in (67A) accounts for double object sentences without difficulty. In (67) the anaphor is coindexed with a terminal argument, so the sentence is acceptable; however, in (70) the anaphor is coindexed with a nonterminal. Thus, according to (67A), sentence (70) is unacceptable.

Examples (71) and (72) indicate that the relevant domain for the coindexing of r/rs is not a V2, rather, the relevant A-domain for coindexing is a containing A-domain. In both (71) and (72), the anaphor cannot be coindexed with the subject (a terminal argument) of the matrix clause but it can be coindexed with terminal arguments of the embedded clause. Thus, the entire V2 cannot be the relevant domain for the indexing of r/rs. The formulation of the principles of coreference of the present theory and inventive method makes it possible to predict the overlapping environments of pronouns and anaphors in sentences like (73). The fact that the pronoun them is also allowed in sentence (73) is correctly predicted given (67A) and (67B). The anaphor can be coindexed with the subject of the matrix verb because it is a terminal argument. The pronoun can be coindexed with the subject of the matrix sentence because the pronoun is not coindexed in its smallest nontheta marked X2. Sentence (73) presents another case where the domains of pronouns and anaphors overlap. The anaphor is correctly coindexed with the next higher subject, and the pronoun is free within its minimal domain (the P, about himself).

The domain for the coindexing of r/rs is the A-domain that contains the r/r. The statement in (67A) is written for 'the smallest A-domain that contains the r/r and a higher terminal' because of sentences like (73) and (74). In (73) and (74), the A-domain for the coindexing of an r/r contained in a subject is neither the A-domain of the subject nor the A-domain of the embedded V2, but rather, the A-domain for coindexing is that which contains the r/r and a higher terminal. Sentence (75) illustrates that the presence of a higher terminal is not required for the coindexing of r/rs in subjects: (67A) states that if there is a terminal that is higher than the r/r it is the A-domain of the higher terminal that ir relevant for coindexing purposes, but its presence is not required.

Sentence (76) is unacceptable because the N2 that is coindexed with the r/r is not a terminal argument as required by (67A). The possessive John's is within a terminal but it is not a terminal itself, so interpretation is not possible.

In sentence (77) the anaphor can be coindexed with either of the terminals in the matrix sentence. In sentence (77) both John and Bob can be coindexed with the anaphor because both are terminal arguments in the A-domain that contains the r/r and a higher terminal.

In sentences (78) and (79), the relevant A-domain for the coindexing of the r/r is the infinitival clause. In these sentences, the r/r is interpreted with the e.c. subject of the r/rs A-domain in accordance with (67A). In (78) the e.c. is interpreted with Bob by (23Bi), so the e.c. bears that index. The e.c. in (79) is interpreted with the N2 in the cleft sentence, so the e.c. bears the index of that N2.

The principle in (67A) can also account for many of the cases of 'exceptional anaphors' discussed in Pollard and Sag (1992). Pollard and Sag provide a number of sentences which are exceptions to theories that are based on c-command. In these sentences there is an anaphor contained within the subject of a sentence which is coindexed with another N2 in the same sentence. (80) provides an example.

EXAMPLE (80)

The picture of herself1 on the front page of the Times confirmed the allegations Mary1 had been making over the years.

Pollard and Sag (1992) propose a solution formulated in terms of a hierarchy of obliqueness of grammatical relationship to account for such sentences. Specifically, their solution proposes that coindexing is sensitive to the obliqueness of grammatical relations as specified in (81) (From Pollard and Sag 1992:6). In their formulation, ' . . . an anaphor must be coindexed with a less oblique argument.' In the current theory and inventive method, it is not necessary to refer the notion of obliqueness to account for these sentences. The correct results are generated by (67) without modification.

EXAMPLE (81)

Subject<Primary object<Second object<other complements

The formulation of the coindexing requirement for r/rs of this theory and inventive method can account for such sentences without difficulty. In sentence (81) the relevant A-domain for the coindexing of the r/r is the entire V2; the N2, Mary is a terminal argument so interpretation is allowed. Note that in (82) interpretation with a nonterminal is not possible.

EXAMPLE (82)

*The picture of himself on the front page of the Times confirmed the allegations Mary had been making about John.

The Pollard and Sag (1992) formulation also needs to distinguish between anaphors that are coarguments and those that are not, in order to account for contrasts such as those in (83) below.

EXAMPLE (83)

A. Mary1 explained Doris2 to herself ½
B. *The fact that Sue likes himself1 is believed (by Mary) e to be disturbing to Tom1

According to Pollard and Sag, sentence (83B) is unacceptable because the anaphor and its referent are not coarguments of the same verb. (83A) is acceptable because the r/r is coindexed with a terminal argument in the appropriate A-domain. In the present theory and inventive method, (83B) is unacceptable because Tom is not coindexed with a terminal argument in the A-domain that contains the r/r and a higher terminal. The A-domain with the higher terminal for (83B) is, Sue likes himself. There is no need to appeal to the notion of coargument.

9.3. Pronouns.

Sentences (84) through (91) illustrate (67B). (67B) states that a pronoun cannot corefer with a coargument (where coargument is an argument of the same head) in the same A-domain.

Example (84): John1 likes him*1
Example (85): John1 gave a book to him*1
Example (86): John1 likes the pictures of him1
Example (87): John1 likes Bob's2 pictures of him1 2
Example (88): John1 gave a book to the man near him1
Example (89): John1 took the money with him1
Example (90): John1 threw a brick at him*1

In (84) and (85), coreference is impossible because the pronoun and its referent are both arguments in the same A-domain in violation of (67B). In (86), however, corefence is possible because the pronoun is an argument of the N0 pictures and its referent is an argument of the verb like. They are arguments of different A-domains so coreference is allowed.

In (87) the pronoun can corefer with the N2 Bob's because the N2 Bob's is an argument of the N1 pictures of him and the pronoun is an argument of the N0 pictures. the attachment of the P to the N0, and the attachment of the possessive to the N1 form different A-domains because they are different heads: one is pictures and the other is pictures of him.

In (88), the pronoun is an argument of the A-domain, the man near him, and the N2 John is an argument of the A-domain of the verb so corefence is possible.

The sentences in (89) and (90) pose a special problem in that they are structurally identical yet the coreference facts are different. That is, in (89) the pronoun is an adjunct argument and coreference is allowed. However, in (90) the pronoun is again in an adjunct argument, but coreference in not possible. The statement in (67B) predicts that coreference should be unacceptable as is the case with (90). It is unacceptable because the pronoun is an argument of the same A-domain as its referent. The difference between (89) and (90) cannot have a structural explanation, so it is necessary to look to semantics to describe this phenomena. A semantic explanation is available here. In the cases when corefence is impossible the adjunct argument participate in the action of the verb as in (89); however, in those cases when the pronoun does not participate in the action of the verb coreference is allowed.

Examples (91) and (92) illustrate those cases in which it seems that coreference with abutments that arc not coarguments is also precluded. That is, in (91) and (92) coreference with the object of the matrix sentence is not allowed though coreference with the subject of the matrix sentence is acceptable.

Example (91): John1 asked Bob2 e to vote for him1/*2

Example (92): John1 persuaded Bob2 e to vote for him1/*2

(67B) does allow corefence of the pronoun with the object of the matrix sentence. The violation in this sentence is not the result of the fact that the pronoun and the object of the matrix sentence bear the same index. The problem here is that the e.c. which is interpreted with the object of matrix sentence is a coargument of the pronoun. Because the e.c. is interpreted with the N2, Bob, the e.c. has all the qualities of that N2. In short, after interpretation, the N2 and the e.c. are identical: the sentences in (91) and (92) are not acceptable because the e.c. is a coargument in the same A-domain as the pronoun.

9.5. Possessives.

The statement for the coreference of possessives allows possessives to corefer with items outside its A-domain as in (92A). However, if a possessive is to corefer with an item in its A-domain, it must be a terminal argument as in (92B) through (92E).

EXAMPLE (92)

A. His1 mother is here.

B. John1 likes his1 mother

C. I gave every man1 his1 paycheck

D. *I gave every his1 paycheck every man1.

E. I gave the book to Bob1 for his1 birthday.

F. *I gave her1 book to Bob for Mary1

G. *His1 mother likes John1

(92A) illustrates that possessive can corefer with items outside their A-domains. (92B) demonstrates that it is possible for a possessive to corefer with a subject (a terminal argument), and (92C) illustrates that a possessive can be interpreted with an object (also a terminal argument). However, as illustrated in (92D), coreference with the indirect object (a nonterminal) is not possible.

9.6. R-expressions.

(67D) states that r-expressions cannot refer to items within the same independent argument as the r-expression. (67D) predicts the facts in (93).

EXAMPLE (93)

A. John1 likes himself1.

B. *John1 likes him1.

C. *John1 likes John1.

D. *He1 likes John1

E. John1 believes Mary likes him1

F. He1 believes Mary likes John1

In (93A) the r-expression the smallest independent argument[15] of the r-expression is the subject, so coreference with items outside that argument is allowed. In (93B) and (93C) the coindexing of the r-expression in subject position does not violate (67D). However, the pronoun object in (93B) and the r-expression object in (93C) violate (67B) and (67D) respectively: in (93B) the coindexing of the pronoun violates (67B) and in (93C), the coindexing of the object N2

[15] In the discussion of the interpretation of e.c.s in subject position, it was noted that the A-domain of an e.c. that is a subject is the entire sentence, but the A-domain of an e.c. WITHIN a subject was the subject itself. This differs from (67D) because the domain for coreference is an A-domain. The domain for the coindexing of r-expressions, however, is an independent argument, so an r-expression that is a subject as well as an r-expression within a subject will have the subject as the relevant domain for coreference. violates (67D) because the smallest independent argument of the N2 is the entire V2. Also, in (93D) the coindexing of the r-expression does not violate (67D), but the coindexing of the pronoun violates (67B).

In (93E) coreference is possible because both the r-expression and the pronoun conform to their respective coindexing requirements. The r-expression is not coindexed with an item in its smallest independent argument, and the pronoun is not coindexed with a coargument in its smallest A-domain. In (93F) coreference is not possible because the smallest A-domain of the pronoun is the entire V2 and the r-expression is contained within that A-domain in violation of (67B). In (93E) the smallest A-domain of the e.c. is the embedded V2. The fact that the entire V2 is the relevant domain for (67B) but not for (67D) is due to the fact that (67B) is written for the smallest A-domain and (67D) is written for the smallest argument.

10. Crossover.

This discussion presents an analysis of Strong and Weak Crossover. Examples of Crossover sentences are presented in (94) through (96). The examples demonstrate that a wh word is within the same structural domain as a pronoun or an r-expression in such sentences. That is, in the unacceptable sentences below, a pronoun cannot corefer with the wh word to its left. (first described in Langacker 197 'On pronominalization and the chain of command.', David A. Reibel and Sanford A. Schane eds., *Modern studies in English*. New Jersey: Prentice-Hall, and Wasow, *Anaphoric relations in English*. MIT dissertation. 1972)

EXAMPLE (94)

Strong Crossover

A. Who1 thinks [Mary likes him1]?

B. *[Who1 does he1 think [Mary1 likes e1]?

C. *[Who1 does John1 think [Mary likes e1]?

D. *who1 does mary think [he1 said sue kissed e1]

The acceptability facts of the sentences in (94) result from the fact that the e.c. is an R-expression and as such, cannot corefer with an item within its smallest independent argument. The unacceptable sentences in (94) violate (67D). In (94B) the smallest independent argument of the e.c. is the entire V2. By virtue of being interpreted with the wh word the e.c. bears the same index as the wh word, so the e.c. cannot be in the same independent argument of the pronoun. This violation is identical to that of (95) where the pronoun he bears the same index as the proper noun John in violation of (67D). (94C) and (94D) also violate (67D) for the same reasons.

EXAMPLE (95)

*He1 thinks Mary likes John1

EXAMPLE (96)

Weak Crossover

A. *[Who1 does his1 mother love e]?

B. *[Who1 does Johns1 mother love e]?

The sentences in (96) illustrate Weak Crossover sentences. In both (96A) and (96B) the possessive cannot be interpreted with the wh word to its left. The statement for the coindexing of possessive pronouns of (67C) states that a possessive pronoun cannot corefer with a previously attached item. In the Weak Crossover sentences the e.c. is bears the same index as the wh word and it is a previously attached argument thus (67C) is violated.

B. Description of the Parser

Figure 2:
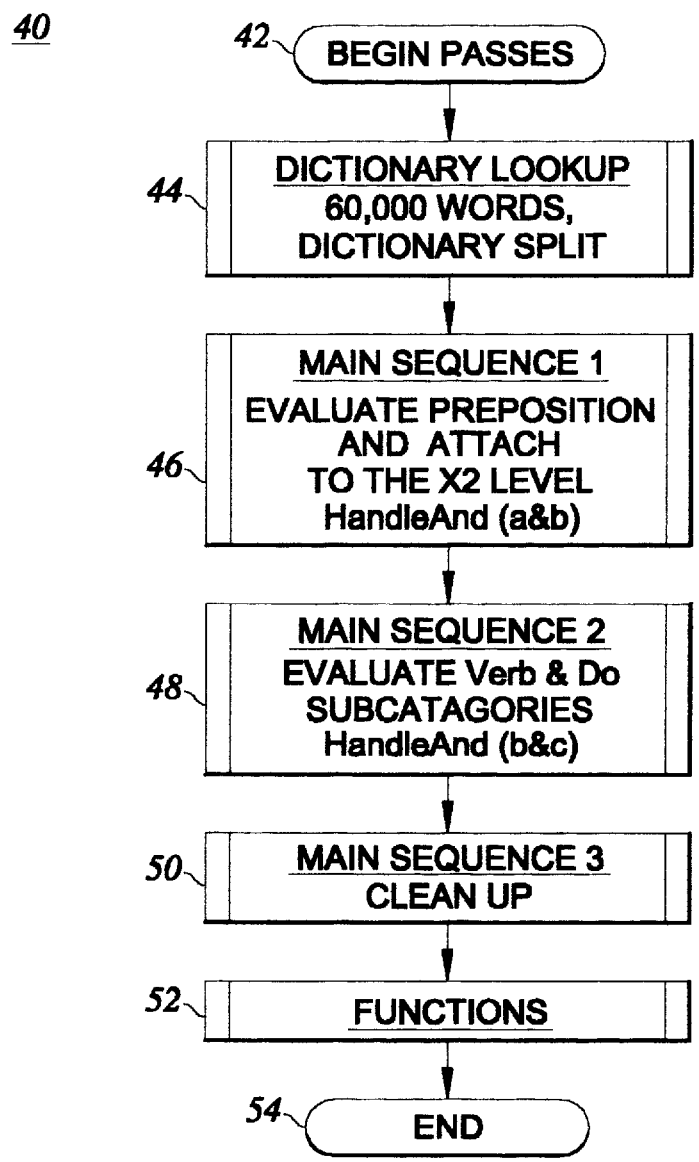
FIG. 2 is a flowchart of a specific embodiment of a parser according to the present invention, illustrating a Main Overview Routine of the method.

Referring now to FIGS. 2–12, flowcharts illustrating operation of the parser are shown. Referring now to FIG. 2, a high level flow chart is shown of a Main Overview Subroutine 40, which governs the overall processing of the parser. As shown in step 42, the routine begins and a dictionary look-up subroutine (step 44) is called. The dictionary look-up function (step 44) operates upon an input string and provides objects or dictionary entries corresponding to each word of the input string, as will be described in greater detail hereinafter. Since one particular word in the input string may have multiple definitions, a "split" is formed. Splits are multiple entries or "copies" of a given sentence that are evaluated, processed, and possible discarded. Elimination of selected splits is a significant feature of the present method and apparatus as it significantly reduces the number of phrases that must be individually parsed, as will be described in greater detail hereinafter. This greatly increases processing speed and efficiency.

A list of splits or phrases to be processed is available to the remainder of the subroutines invoked by the Main Overview Routine (step 40). Next, Main Sequence One (step 46) is called. Briefly, Main Sequence One (step 46) performs the majority of the processing steps, such as evaluating prepositions and participles, performing attachment, and processing conjunctions, as will be described in greater detail hereinafter.

Next, Main Sequence Two is called (step 48). Briefly, Main Sequence Two (step 48) performs evaluation of verbs, processes subcategories, and also processes conjunctions. This subroutine processes the same splits or phases that the previous iteration of Main Sequence One (strep 46) processed. However, if selected splits or phrases were eliminated in Main Sequence One, fewer splits are available to be processed by Main Sequence Two (step 48).

Main Sequence Three (step 50) is then invoked to perform "clean-up" functions, as will be described in greater detail hereinafter. Next, required functions and selected functions are called (step 52). Some of the functions perform required syntactic evaluations, while other functions perform grammatic evaluations after the parse is complete, such as labeling parts of speech and labeling parts of the sentence. Other functions are called depending upon user defined or application-defined criteria such as, changing active to passive and answering yes/no questions specific to the input string, as will be described in greater detail hereinafter. Additionally, some selected functions are called depending upon whether a "strict" or a "weak" embodiment of the parser is executed, as will be described in greater detail hereinafter. Finally, the Main Overview Routine 40 ends, as shown in step 54.

Figure 3:
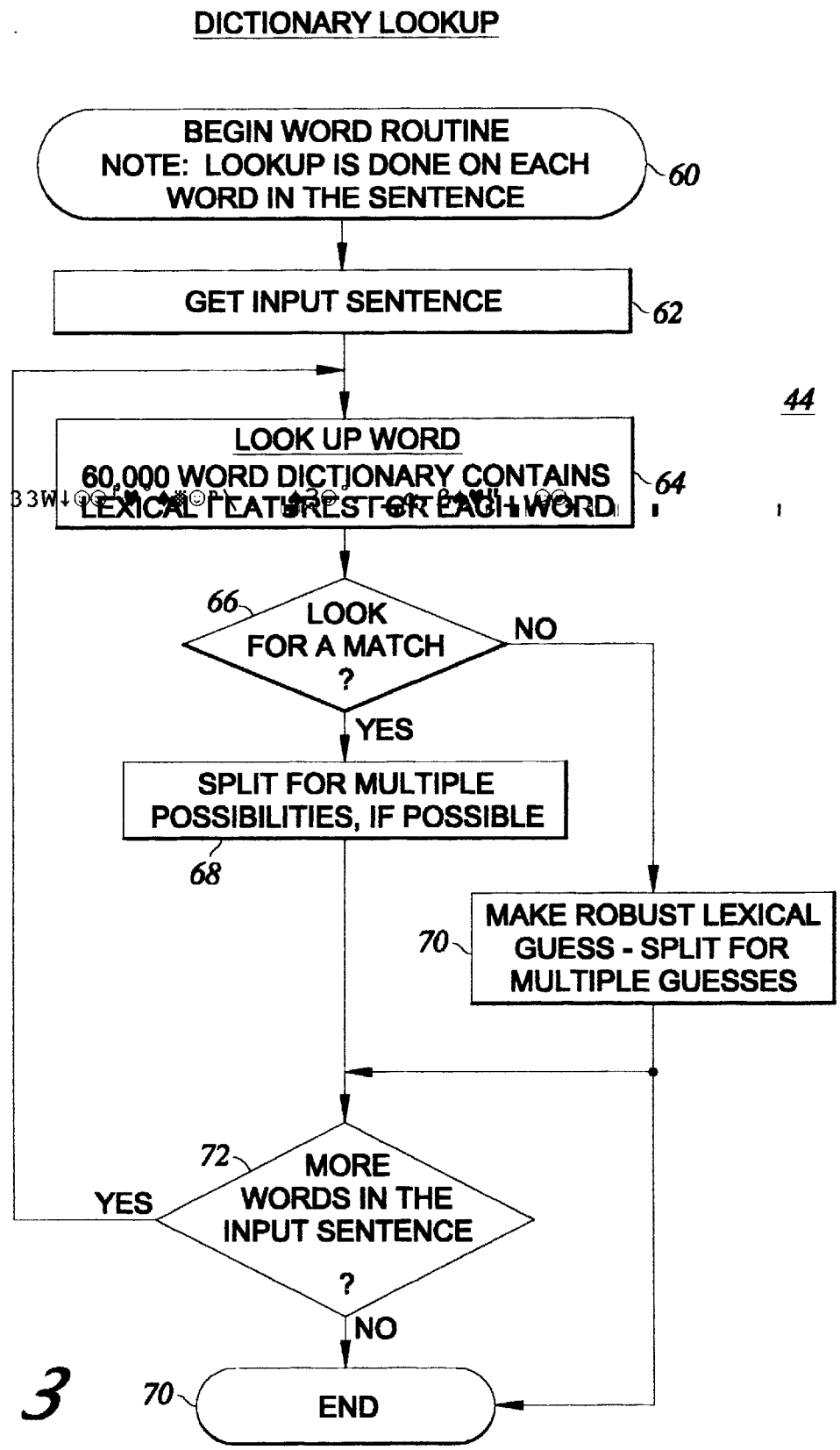
FIG. 3 is a flowchart of a specific embodiment of a parser according to the present invention, particularly illustrating a Dictionary Look-Up subroutine.

Referring now to FIG. 3, the Dictionary Look-Up routine (step 44) of FIG. 2 is shown in greater detail. The dictionary look-up routine (step 44) begins as shown in step 60. Next, the input string is accessed (step 62). Each word in the input string is looked up in the dictionary to provide a dictionary entry (step 64). In this specific embodiment, a sixty thousand word dictionary containing lexical features for each word are used. However, dictionaries containing fewer or greater number of words may be used interchangeably. Each dictionary entry includes syntactic information that is idiosyncratic for each word. As described above, it is possible that a single word in the input string may be associated with multiple indices in the dictionary. This may be possible if the word from the input string is a synonym, such as the word "can," which may be a noun (as in container) or a verb (as in could).

If a match between the word from the input string and the dictionary exists (step 66), it is split to account for multiple entries (step 68), if possible. In this way, a linked list corresponding to a sentence or phrase is built where multiple linked lists are created to account for splits. Of course, any suitable data structure may be used to organize the collection of words of the phrase. For example, a two dimensional grid may be used to contain multiple sentences where each sentence represents a variation caused by a multiple dictionary entry. As referred to herein, the term "linked list" refers to a connected group of words or phrases that are processed, where the links permit access to words adjacent to a particular word in the list. Accordingly, the entire sentence or phrase may be processed by traversing the linked list, as is known in the art. As used hereinafter, the terms "split," "string," "phrase," "sentence," or "a linked list" are used interchangeably.

If a match is not found between the word of the input string and the dictionary, as shown by the "no" branch of step 66, a guess is made as to the closest possible word (step 70) and the entry or split is created in the form of another linked list representing another variation of the input sentence. Such a "guessing" operation may occur if the word of the input string is a valid word but happens to be outside the scope of the dictionary, or if the word is misspelled and, hence cannot be found. In this situation, and educated guess is attempted, rather than rejecting the entire sentence. For example, if the word ends in an "ly," it is defined to be an adverb, if the word begins with a capital letter, it is defined to be a proper noun. If the word is neither a proper noun nor an adverb, then a triple split is created to define the unknown word as an adjective (A0), a verb (V0), and a noun (N0). In this way it is most likely that one the splits will be successfully processed rather than rejecting the entire sentence due to an unknown word. Again, for each split, a complete and self-contained phrase or sentence is formed and is represented as a linked list of words. If the "guess" happens to be incorrect, subsequent processing will eliminate the incorrect split.

After either a match is found, as shown by the "yes" branch of step 66, or a guess is performed (step 70), step 72 is performed to determine if more words of the input string require processing. If more words exist in the input string, as shown by the "yes" branch of step 72, the program branches back to step 64 to continue processing the words in the input string. If no more words require processing, as shown by the "no" branch of step 72, the Dictionary Look-Up subroutine 44 ends, as shown in step 74.

Figure 4:
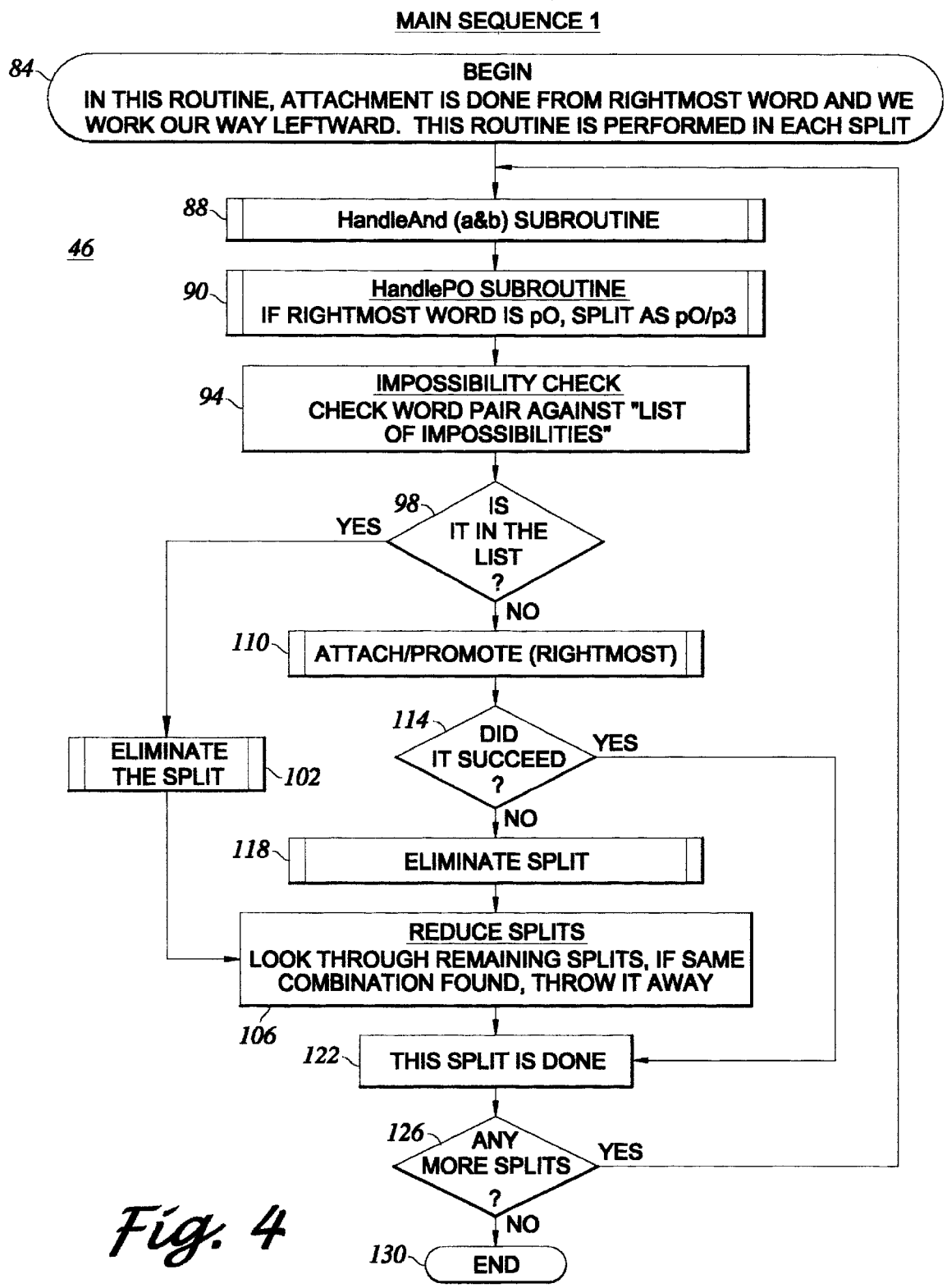
FIG. 4 is a flowchart of a specific embodiment of a parser according to the present invention, particularly illustrating a Main Sequence One subroutine.

Referring now to FIG. 4, a detailed flowchart of Main Sequence One is shown (step 46 as shown in FIG. 2). Main Sequence One begins at step 84 and processes the linked lists or splits created previously. A very significant and important strategy used to analyze phrases or sentences is that for each sentence or split passed to either Main Sequence One (step 46), Main Sequence Two (step 48), or Main Sequence Three (step 50), processing begins at the right-most portion of the string and sequentially proceeds leftward. That is, processing begins from the last word of the string and proceeds toward the first word in the string.

Next, the "Handle-And parts A and B" subroutine is called (step 88) to process the conjunctive term "and." This routine is includes parts A, B, and C where only specific portions are executed, as is shown in FIG. 4. As shown in step 88, only part A and part B of Handle-And are invoked. Briefly, Handle-And joins like words together, such as like words in the phrase "red, white, and blue." In Handle-And part A, once the word "and" is detected, words to the right and to the left of the conjunction are inspected to determine the bar level (e.g., N0, A0, V0). The words to the right are compared to the words to the left and if the bar level is equal to zero and if they are all of the same type (all nouns, all verbs, etc.), then those words are joined into a single phrase. This reduces processing time and reduces possible combinations processed. Handle-And part A processes words or phrases that are defined to be at the zero level, such as N0, V0, A0, and the like.

Handle-And part B processes conjunctions or phrases in a similar way that Handle-And part A processes conjunctions, except that Handle-And part B only deals with words or phrases that are defined to be at the first bar level, such as N1, V1, A1, and the like. Handle-And part C is similar to Handle-And Parts A and B. but is only applicable to words or phrases at the maximum or second level, such as N2, V2, A2, and the like. Note that Handle-And part C is not invoked in Main Sequence One (step 46) since words or phases have only been built up to a maximum bar level of one, such as N0, N1, V0, V1, A0, A1, and the like. Note, however, that Handle-And may be "turned-off" or inhibited, resulting only in a slight reduction in efficiency and an increase in processing time.

Next, the Handle-P0 subroutine (step 90) is called. This subroutine (step 90) checks to see if a preposition exists at the end of the string or sentence. Prepositions are defined in the dictionary as P0. However, if the preposition occurs at the end of the sentence, the preposition may also be used as a particle for a particle verb. Accordingly, a split is created which creates another linked list or string. In this case, the word that caused creation of the split is defined as a P3, to indicate a particle. As described above, the entire list of splits or linked list entries are processed by Main Sequence One (step 46), Main Sequence Two (step 48), and Main Sequence Three (step 50), even though the number of splits may have increased at some intermediate time, due to splits.

To significantly reduce the number of parsing possibilities, that is, to reduce the number of splits, phrases, sentences, or linked list entries to be processed, an Impossibility Check subroutine (step 94) is called. This subroutine is preferably table driven and contains entries which describe various impossible combinations of words, such as two nouns adjacent to each other, and the like. If the phrase or a grouping of two words in the sentence are found in the impossibility list, as is shown by the "yes" branch of step 98, then the entire phrase or linked list entry (split) is deleted, as shown in step 102. For example, if the phrase "the book chair is red" is encountered, and the list of impossibilities indicates that two nouns cannot be adjacent, the entire split is eliminated.

The following are specific examples of impossible conditions shown for purposes of illustration only. The list in not exhaustive and additional conditions may be added.

1. An A0 D0 will never attach.
2. A P0 D0 will never attach.
3. A D0 D0 will never attach.
4 A D0 P0 will never attach.
5. An A0 V0 will never attach.
6. A D0 V0 will never attach.
7. A P0 V0 will never attach.
8. A P0 P0 will never attach.
9. A C0 V0 will never attach.
10. A D0 A0 will never attach.
11. An F0 will never attach to anything except a V0.

After the split has been eliminated (step 102), all remaining splits or entries are searched to determine if any reoccurrences of that impossible combination exist (step 106). If additional occurrences of that combination are found, they are also deleted. Alternately, the list of impossibilities may not be explicit, such as is shown in the above list. Rather, all conditions may be declared invalid or impossible if such conditions are not found in the list of restriction requirements described previously. Such an implicit list of impossibilities also serves to significantly reduce the number of splits.

If the sentence or linked list (split) being processed is not found in the list of impossibilities, as shown by the "no" branch of step 98, the Attachment/promotion subroutine is called (step 110), as will be described in greater detail hereafter. The Attachment/promotion subroutine (step 110) processes a sentence according to selection restriction rules, described above in previous sections. If the Attachment/promotion subroutine (step 110) returns a failure indication, as shown by the "no" branch of step 114, then that split or linked list entry is deleted (step 118). To additionally reduce the number of splits, the remaining splits or linked list entries are searched to find identical occurrences of condition which led to the previous failure. If identical occurrences are found, those splits or linked list entries are also eliminated, as shown in step 106. Elimination of splits and further searches to eliminate reoccurrences of error conditions (step 94) is one of several novel steps that significantly reduce the number of combinations of possible sentences that must be processed. Accordingly, processing time is greatly reduced.

If the Attachment/promotion subroutine (step 110) returns a success indication, as shown by the "yes" branch of step 1 14, then that split or linked list entry is marked as "done," as shown in step 122. Once the number splits have been reduced, the split being process is marked as done (step 122), the list of splits or linked list entries are checked to determine of more splits exist (step 126). If more splits exist, as shown by the "yes" branch of step 126, the routine branches back to step 88 to continue processing the remaining splits. If no more splits exist, as shown by the "no" branch of step 126, the routine ends, as shown in step 130 and processing continues at step 48, as shown in FIG. 2. Note that the output from Main Sequence One (step 46) is not complete by itself. Once Main Sequence One has processed the splits, the result may, for example, be a complex phrase or a complex phrase with verbs. A complete sentence is not yet formed.

Figure 5:
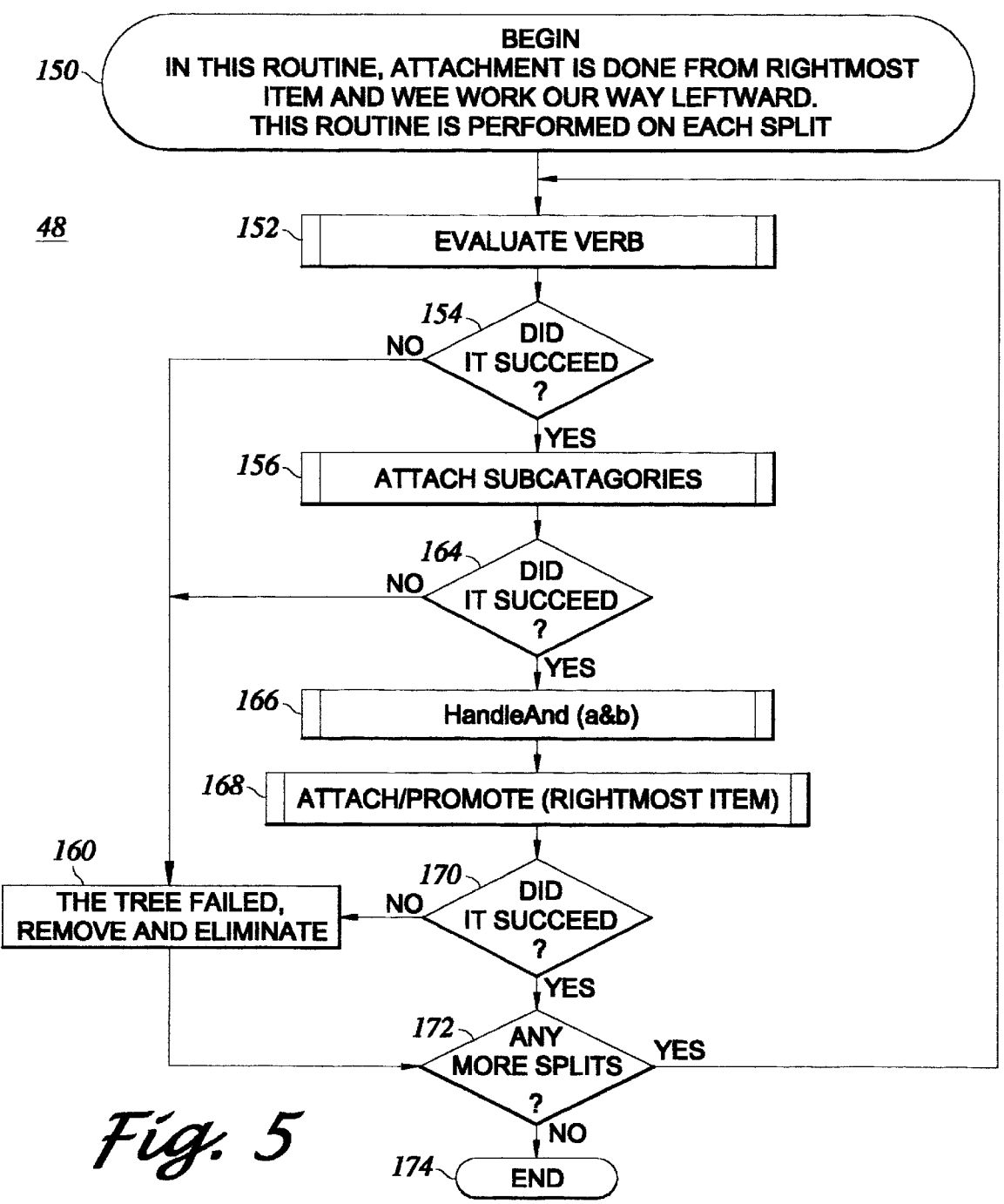
FIG. 5 is a flowchart of a specific embodiment of a parser according to the present invention, particularly illustrating a Main Sequence Two subroutine.

Referring now to FIG. 5, a detailed flowchart of Main Sequence Two (step 48) is illustrated. The subroutines illustrated in Main Sequence Two (step 48) process the verbs (V0) of the sentence. The goal of Main Sequence Two (step 48) is to attach the verb object(s) to the verb, if possible. The verb objects are referred to as subcategories, and are defined by the theta-role identifiers of the theta-grid which is part of the dictionary entry for that verb. Subcategories are the items needed by the verb to form a complete sentence. Essentially, Main Sequence Two (step 48) finds the main verb of the split or sentence, and links the helping verbs to the main verb and then attaches subcategories. Finally it will perform attach/promote one more time. For example, for the verb "give," the predefined subcategories may be "a noun to the left of the verb and two nouns to the right of the verb," such as in the sentence "John (noun) gave (verb) the book (noun) to Mike (noun)." Of course, other subcategories exist to account for all common possible sentence structure combinations.

Referring now to FIGS. 6A–6B, words of a sentence are shown linked together. To clarify terminology as used herein, words of a sentence may be linked in two distinct ways. As described above with respect to the dictionary look-up routine (FIG. 3) and Main Sequence One (FIG. 4), a typical split or a linked list entry is shown in FIG. 6A. For example, in the sentence shown in FIG. 6A, items are shown linked together: noun (N2), verb (V0), determiner (D0), adjective (A0), and preposition (P0). FIG. 6B illustrates that a split is formed due to the ending preposition P0. Accordingly, two entries are formed where each is a linked list linking the words of the sentence. These linked lists are referred to as the "splits" and are sequentially processed.

However, another form of organizing the phrase or sentence is encountered in Main Sequence Two (FIG. 5). Here, various subroutines form "tree structures." In this situation, shown in FIG. 6C, each item in the linked list is represented as a node in a tree. Not only is the link information important, but the position of the word in the tree is important. As items in the linked list are processed and organized into a tree structure, various connected items or phrases are given dominant and submissive positions. In FIG. 6C, items "b" and "c" and items "d" and "e" are grouped together. Each grouping indicates a partial parses. Subsequent processing links the two partial parses together, as shown in FIG. 6D.

Referring back to FIG. 5, Main Sequence Two 48 begins at step 150 and is similar to Main Sequence One (step 46 of FIG. 4) in that the phrase or split is processed from right to left. First, the subroutine Evaluate-V0 or Evaluate-Verb (step 152) is called. This subroutine (step 152) determines the right-most verb in the split or linked list. Note that a verb sequence is determined while ignoring adverbs. The Evaluate-Verb subroutine (step 152) returns a failure indication if no verb is found in the sentence, as is described in greater detail hereinafter.

If the Evaluate-Verb subroutine (step 152) was successful, as shown by the "yes" branch of step 154, the "Attach-Subcategories" subroutine is called, as illustrated in step 156. The Attach-Subcategories subroutine (step 156) attempts to link the verbs in the sentence, including the helping verbs, to form a proper verb sentence. The Attach-Subcategories subroutine is described in greater detail hereinafter. If Evaluate-Verb (step 152) was not successful, as shown by the "no" branch of step 154, the tree is marked as a failure (step 160) and it is eliminated, further reducing the amount of required processing.

Next, if the result of Attach-Subcategories indicates success, as shown by the "yes" branch of step 164, then the subroutine Handle-And Parts B and C is called, as illustrated in step 166. If the result of Attach-Subcategories (step 156) indicates failure, as shown by the "no" branch of step 164, then the tree is marked as a failure and it is eliminated (step 160). After Handle-And Part B and C has been executed (step 166), the subroutine Attach/promote is called (step 168). This is the same subroutine as shown in FIG. 4. If the result of the subroutine Attach/promote (step 168) is failure, as shown by the "no" branch of step 170, then the tree is marked as a failure and it is eliminated (step 160). If the Attach/promote subroutine (step 168) is successful, as shown by the "yes" branch of step 170, processing continues at step 172 where remaining splits or linked lists (trees) are processed. If additional splits or linked lists exists, processing branches to step 152, as indicated by the "yes" branch of step 172. If no more splits or linked lists exists, Main Sequence Two 48 ends, as shown in step 174.

Figure 7:
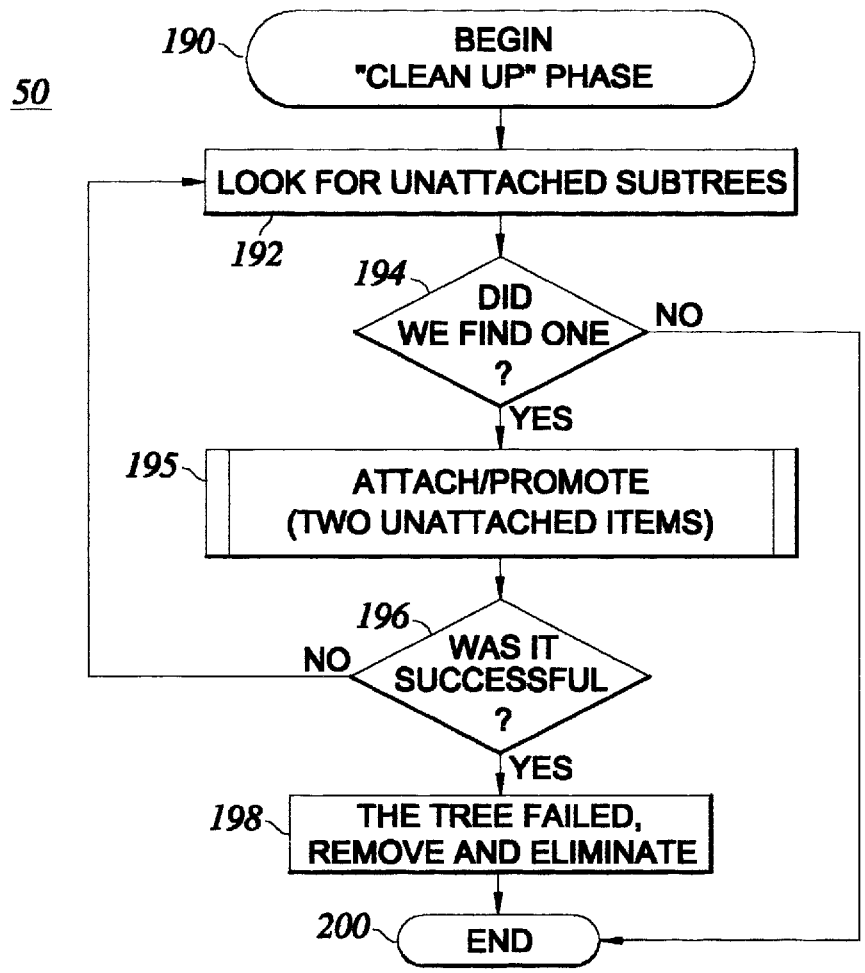
FIG. 7 is a flowchart of a specific embodiment of a parser according to the present invention, particularly illustrating a Main Sequence Three subroutine.

Referring now to FIG. 7, Main Sequence Three (step 50) is shown in greater detail. The subroutine begins, as shown in step 190 and all unattached subtrees, if any, are located (step 192). If unattached subtrees are located, as shown by the "yes" branch of step 194, then the Attach/promote subroutine is called (step 195) to join the unattached subtrees. If no unattached subtrees are found, as shown by the "no" branch of step 194, then the subroutine ends, as shown in step 196.

Subtrees may be unattached since Main Sequence One (FIG. 4) and Main Sequence Two (FIG. 5) each call the subroutine Attach/promote (FIG. 9), which is partially responsible to permitting creation of multiple trees within a single sentence. As will be described in greater detail in a following section, the subroutine Attach/promote (step 195) processes the input sentence (split) in a right to left manner and attempts to attach adjacent words. However, the subroutine "skips" over verbs and continues processing to the left of the verb, if found. This creates separate trees within the sentence. That is to say, processing may skip one portion of the sentence and continue processing a leftward portion of the sentence once a word or several words have been skipped. In that situation, two or more independent subtrees may be formed which correspond to a single sentence or phrase.

After the subroutine Attach/promote (step 195) has been executed, step 196 determines whether the attachment was successfully performed. If the subroutine Attach/promote (step 195) was not successful, as shown by the "no" branch of step 196, processing branches back to step 192 to continue searching for unattached subtrees. If the subroutine Attach/promote 195 was successful, as shown by the "yes" branch of step 196, the tree is marked for failure and it is eliminated (step 198). Subroutine Main Sequence Three (50) then ends, as shown in step 200.

Figure 8:
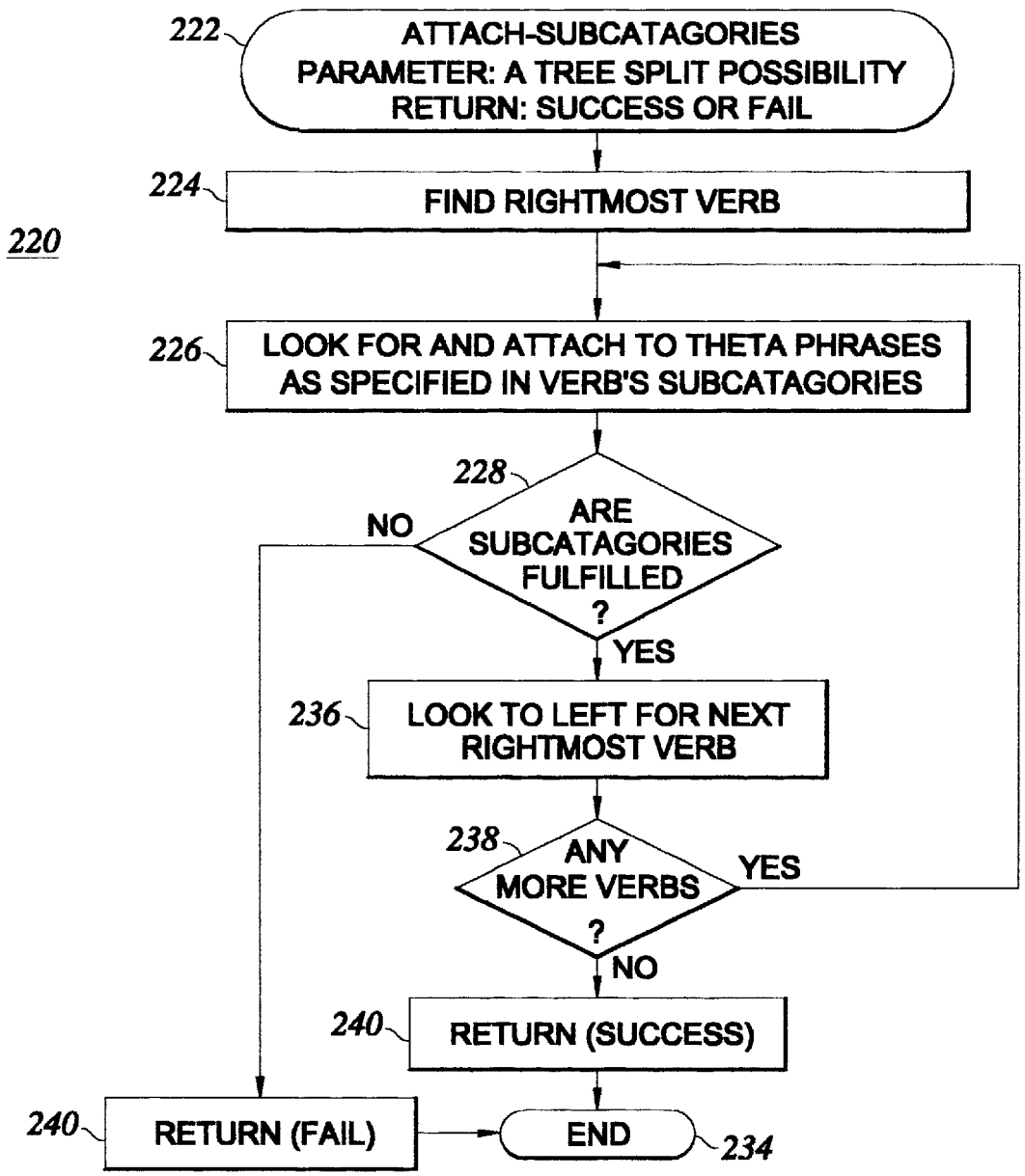
FIG. 8 is a flowchart of a specific embodiment of a parser according to the present invention, particularly illustrating detailed steps of an Attach-Subcategories subroutine.

Referring now to FIG. 8, a detailed description of the Attach-Subcategories subroutine (step 220), is shown. The Attach-Subcategories subroutine was originally called from Main Sequence Two (FIG. 5). The Attach-Subcategories subroutine 220 begins at step 222 and searches the sentence or split for the right-most verb (step 224). Once the right-most verb has been located, the required theta phrases, as specified by the theta-roles in the dictionary entry for that verb, are obtained and attached to theta phrases as specified by the verb's subcategories in the dictionary, as shown in step 226. As described above with respect to FIG. 5, step 156 (calling of the Attach-Subcategories subroutine 226), the subcategories are the items needed by a verb to form a complete sentence and are defined as part of the dictionary entry for that verb. The subcategories are the theta-roles within the theta grid corresponding to the dictionary entry.

Next, if the subcategories corresponding to the verb are fulfilled by the action taken in step 226, as shown in the "yes" branch of step 228, the sentence is searched to locate the next verb disposed to the left of the verb that was previously processed. If another verb is found, as shown by the "yes" branch of step 238, processing branches back to step 226 to determine the required subcategories for the newly located verb. If no more verbs are found in the sentence, as shown by the "no" branch of step 238, success is indicated (step 240) and the subroutine ends, as shown in step 234. If the subcategories corresponding to the verb are not fulfilled, as shown by the "no" branch of step 228, a failure is declared (step 230) and the subroutine ends, as shown in step 234.

Figure 9:
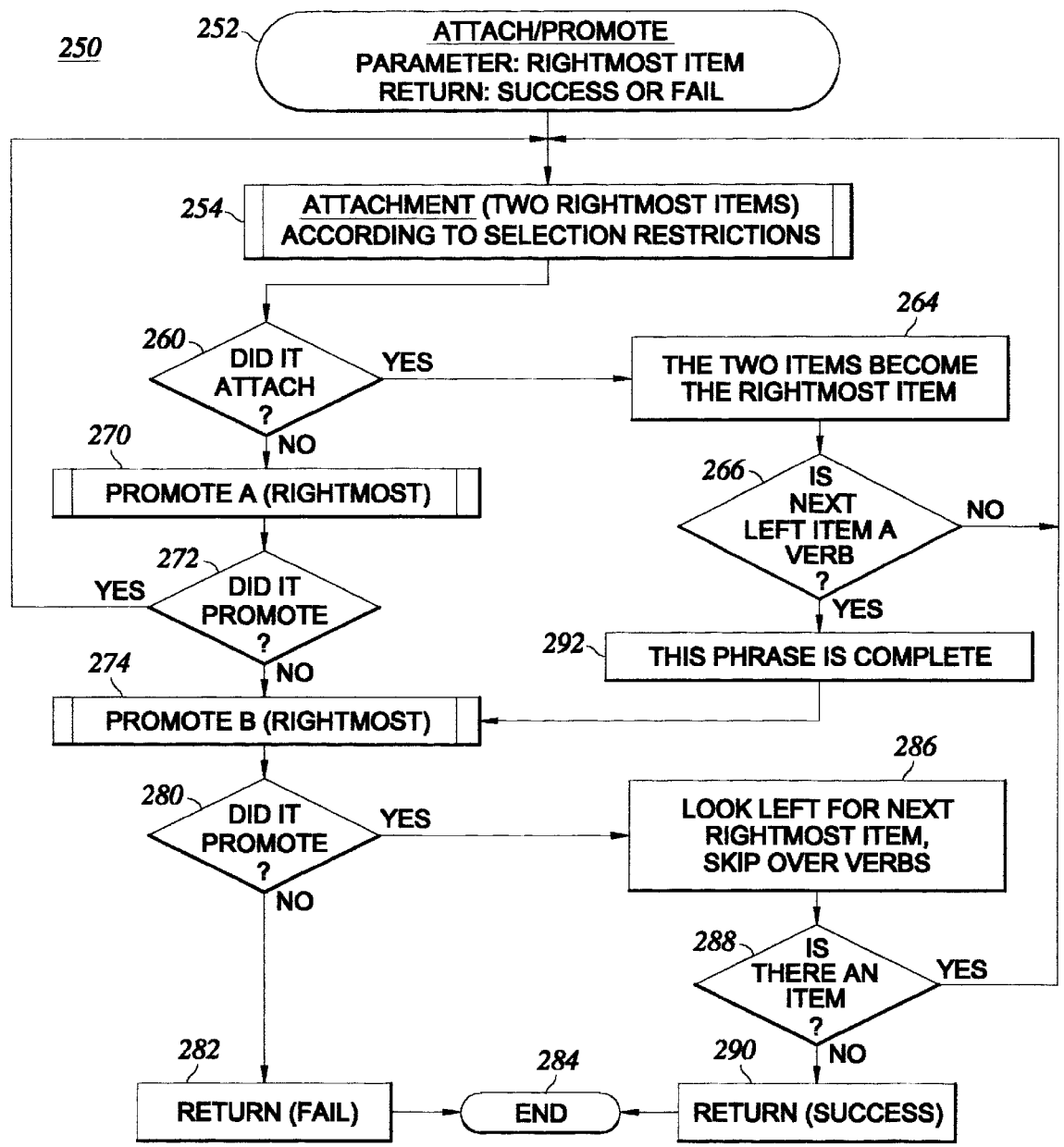
FIG. 9 is a flowchart of a specific embodiment of a parser according to the present invention, particularly illustrating detailed steps of an Attach/promote subroutine.

Referring now to FIG. 9, the Attach/promote subroutine 250 is shown in greater detail. Note that the Attach/promote subroutine is called from multiple locations, such as from Main Sequence One (FIG. 4), Main Sequence Two (FIG. 5) and Main Sequence Three (FIG. 7). The subroutine begins at step 252 and attachment is attempted, as shown in step 254. Attachment (step 254) attempts to join or attach two items or words according to specific selection restrictions. The section restriction rules are described in detail in previous sections. Initially, attachment (step 254) begins at the right-most word of the sentence or split and proceeds in a leftward manner. Attachment, attempts to only attach or link two words (or a linked phrase) together at this point. If attachment was successful, as shown by the "yes" branch of step 260, then the two items that are attached and become the rightmost item to be used in the next iteration of attachment (254), as shown in step 264. Next, as shown in step 266, the next leftmost word is inspected, and if that word is not a verb, as shown by the "no" branch of step 266, processing branches back to step 254 to resume the next iteration of attachment.

If the two rightmost items did not successfully attach, as shown by the "no" branch of step 260, Promotion part A is called, as shown by step 270. As described above, Promotion part A is the "dominance-type" promotion where an item (X0) that immediately dominates another equal item is promoted by one level. For example, any X0 (meaning any identified part of speech, such as a noun (N), a verb (V), an adjective (A), and the like) that immediately dominates another X0 is promoted by one level, to a maximum level of X2. Next, if Promotion part A is successful, as shown by the "yes" branch of step 272, processing branches back to step 254 to continue the next iteration of attachment. If Promotion part A did not succeed, as shown by the "no" branch of step 272, then Promotion part B is attempted, as shown in step 274. Again, as described in greater detail above in a previous section, Promotion part B specifies that an unattached item is promoted by one level to a maximum level of X2. Therefore, an unattached item at level X0 is promoted to a level X1, an unattached item at level X1 is promoted to a level X2, and an item that is at level X2 remains at X2, since that is the highest possible level. If the result of Promotion part B is unsuccessful, as shown by the "no" branch of step 280, a failure is indicated (step 282) and the subroutine ends, as shown in step 284.

If the result of Promotion part B is successful, as shown by the "yes" branch of step 280, the sentence is searched for the next rightmost item or word, as shown in step 286. However, in step 286, all verbs are skipped and are not processed at this time. As described above, such skipping of verbs permits the creation of multiple trees within a single sentence or split. Next, if there are more words or items to be processed in the sentence, as shown by the "yes" branch of step 288, processing branches back to step 254 to continue with the next iteration of attachment. If there are no more words or items in the sentence, as shown by the "no" branch of step 288, a success is indicated (step 290), and the subroutine ends, as shown in step 284.

Referring back to step 266, if during iterative processing of the sentence, a verb is detected, as shown by the "yes" branch of step 266, step 292 marks the phrase or sentence as "complete" and Promotion part B (step 274) is performed again. Processing continues in this manner until items and words in a sentence are processed.

Figure 10:
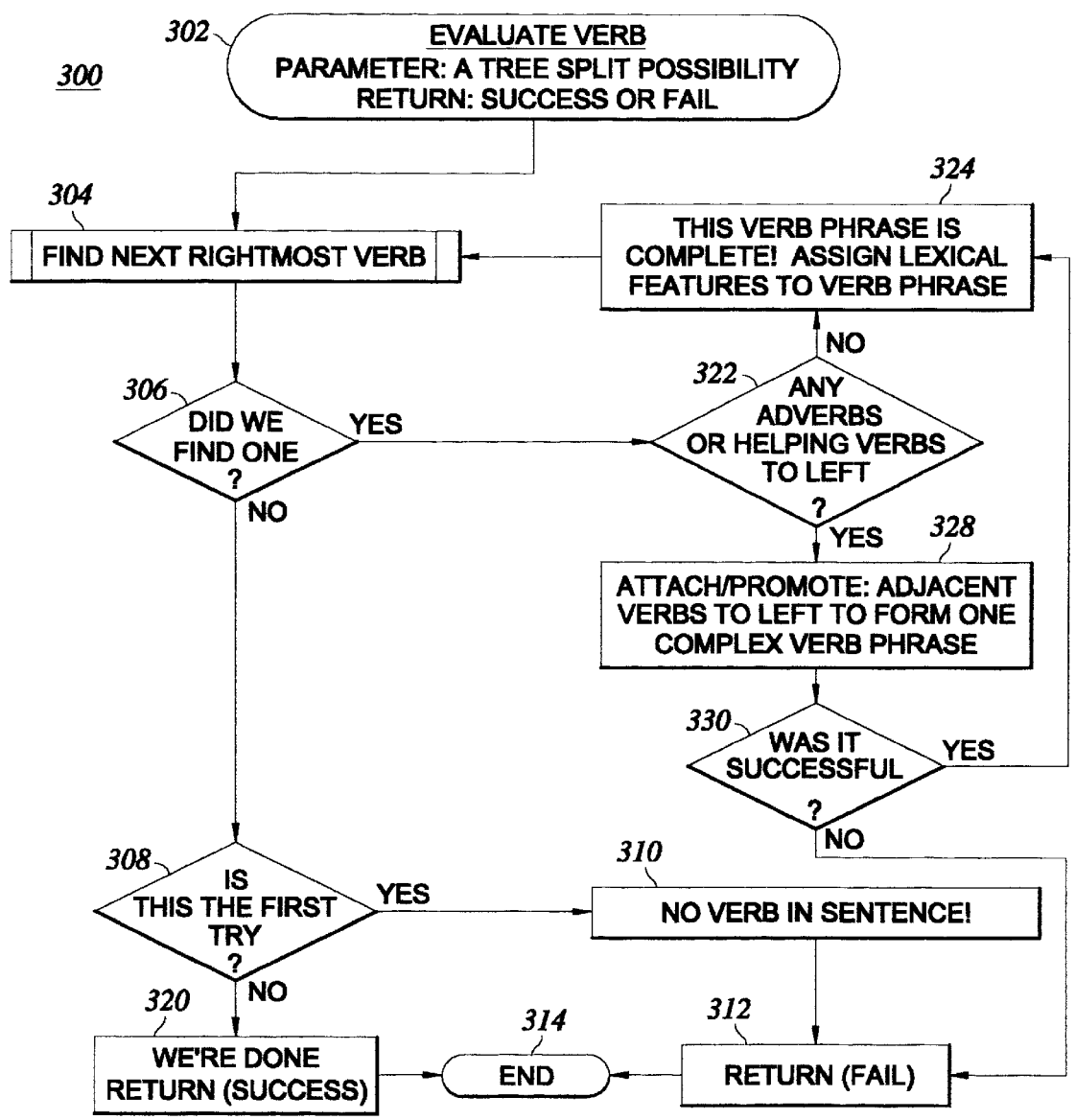
FIG. 10 is a flowchart of a specific embodiment of a parser according to the present invention, particularly illustrating detailed steps of an Evaluate-Verb subroutine.

Referring now to FIG. 10, the subroutine Evaluate-Verb 300 is shown in greater detail. Note that the subroutine Evaluate-Verb is called from Main Sequence Two (FIG. 5). The subroutine begins at step 302 and the sentence or split is searched to locate the rightmost verb of the sentence, as shown in step 304. If no verb is found, as shown by the "no" branch of step 306, step 308 is performed to determine whether the search to locate the verb was the first or the initial search. If the search to locate the verb was the first search, as shown by the "yes" branch of step 308, then no verb at all was found in this sentence (step 310). This is an error condition since every proper sentence must include at least one verb. Accordingly, a failure is indicated (step 312) and the subroutine ends, as shown in step 314. If the attempt to locate the verb was not the first attempt, as shown by the "no" branch of step 308, then at least one verb must have been located. Accordingly, a success is indicated, as shown in step 320 and the subroutine ends (step 314).

If a verb was located in the sentence, as shown in the "yes" branch of step 306, the sentence is searched to locate adverbs or helping verbs to the left of the verb being processed, as shown in step 322. If there are no adverbs or helping verbs to the left of the verb being processed, as shown by the "no" branch of step 322, the verb phrase is marked as complete, and lexical features are assigned to that verb phrase, as shown in step 324. The lexical features include information such as, sentence type, tense, negative or affirmative, simple or complex, or compound, and the like. The verb phrase is indicated as being complete since adverbs or helping verbs have been identified to the left of the verb being processed. However, additional verb phrases may exist within the sentence. Accordingly, processing continues with step 304 to continue attempting to locate the next rightmost verb until all verbs have been processed.

If adverbs or helping verbs were located to the left of the verb being processed, as shown by the "yes" branch of step 322, the subroutine Attach/promote is called to attach adjacent verbs to form a complex verb phrase (step 328). However, the subroutine Attach/promote, when called from within the Evaluate-Verb subroutine (step 300), represents the second time that Attach/promote has been called. As such, verbs are not skipped over in the second call to Attach/promote (step 328).

If the result of Attach/promote (step 328) is successful, as shown by the "yes" branch of step 330, processing branches to step 324 to mark the verb phrase as complete. If the result of Attach/promote is unsuccessful, as shown by the "no" branch of step 330, a failure is indicated (step 312) and the subroutine ends (step 314).

Figure 12:
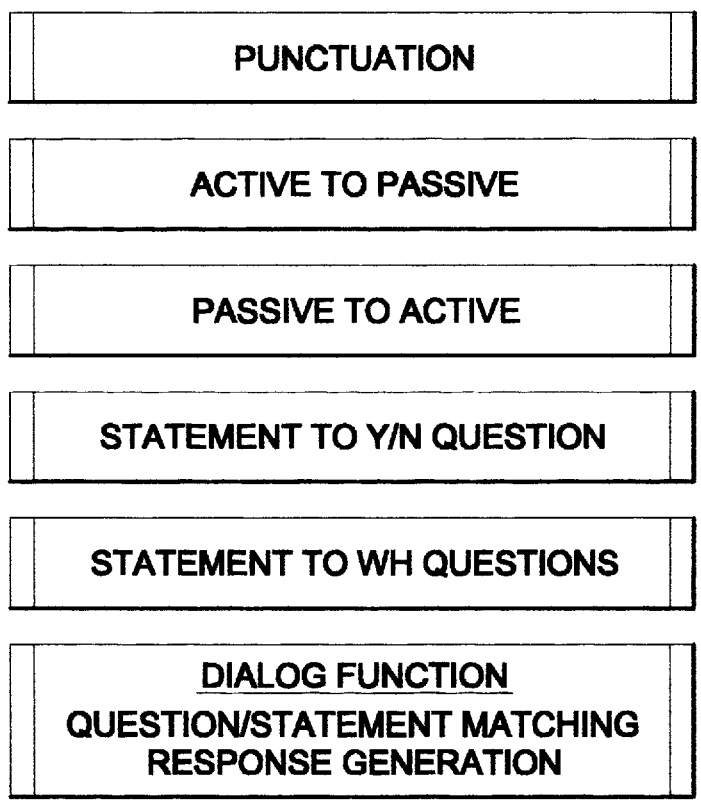

Referring now to FIGS. 11 and 12, various functions are shown. The first two groups of functions shown in FIG. 11 are required functions, which are called in the Main Overview Routine 40 shown in FIG. 2. The first group of functions, referred to as "syntactic evaluation functions," (400) are required to perform a proper parse. These functions are enumerated below along with a brief description of the function.

a) Anaphors (402): checks the basic coindexing requirements of anaphors; e.g., "John likes himself" NOT "John likes herself."

b) Anaphor/reference checking (404): checks more specifically that referents are properly aligned with pronouns and reflexives.

c) Mark Domains #1 (406): isolates the domains in which the interpretations and coindexing functions operate—this function marks argument domains.

d) Mark Domains #2 (408): isolates the domains in which the interpretation and coindexing functions operate—this function marks independent domains.

e) Theta Role Assignment (410): requests the identity of the theta roles of verbs with respect to their arguments on the basis of location (e.g. an agent is before the verb, the theme is after the verb, and so forth).

f) Theta criterion (412): marks all sentences as a failure in which N2 modifiers of a verb have not received a theta role according the Theta Role Assignment function, described immediately above.

g) Interpretation of e.cs (414): finds an appropriate N2 to associate with an e.c. or marks the sentence as a failure.

The second group of functions, referred to as "grammatic evaluation functions" (420) are required to perform a proper parse, but are performed once the three main sequences (FIG. 2, steps 46, 48, and 50) have been completed. These functions are enumerated below along with a brief description of the function.

h) Sentence Tense (422): isolates the tense of a verb and places this information in the V2 maximum feature of the theta grid.

i) Label a/t/g/ (424): labels the theta roles of particular N2s.

j) Sentence Type (426): determines the type of the sentence, i.e. whether the sentence is a question, a negative question, a statement, or a negative statement, and places this information in the sentential feature grid.

k) Label Objects (428): labels parts of the sentence, e.g., the subject, the object of the verb, the object of the preposition and so on.

l) Subject/Verb Agreement (430): determines whether the proper verb forms are chosen for each subject; e.g. "John likes Mary," NOT "John like Mary."

m) Locate All Clauses (432): finds clauses and labels their type and identifies their tense.

n) Label Parts of Speech (436): labels each word in the sentence (noun, verb, adjective, adverb, etc.)

o) Identify Sentence Type (438): simple, compound, or complex sentences are identified.

The third group of subroutines, referred to as "manipulation subroutines," (FIG. 12, 450) are dictated by the user or by the particular application incorporating the novel inventive parser. Note that these subroutines are not necessarily required to perform a proper parse. Rather, these subroutines are used to obtain particular results once the parser has completed processing. These subroutines are enumerated below along with a brief description of the subroutines.

p) Punctuation (452): checks for compliance with punctuation rules, label errors, and offers corrections to the user.

q) Active to Passive (454): changes the sentence from active to passive.

r) Passive to Active (456): changes the sentence from passive to active.

s) Statement to Yes/No Question (458): changes a statement to a question.

t) Statement to wh Question (460): changes a statement to a who, what, when, why, how type of question.

u) Dialog Subroutines (462): parses questions to match it with a user or application selected database to provide a proper response to the question.

As described above, the manipulation subroutines are dictated by the user or by the particular application incorporating the parser. The inventive method and apparatus or parser may be embodied in a variety of products or devices to provide the user with a plethora of options. Possible applications well suited for incorporating the above-described novel parser include, but are not limited to: translation software and devices, grammar checkers (for native speakers and for nonnative speakers of a language), punctuation checkers, foreign language tutoring software, handicap access software, native language tutoring, education for reading, interactive dialoging software for interactions with game characters, databases, personal information managers, contact managers, computer enhanced living environments (the interactive home), appliances, automobiles, and so on. It can also be used for interactive dialogs with toys such as dolls or robots, large statues (e.g. a talking statue of Mickey Mouse), and other objects.

There are various embodiments of the parser described above that have been developed. For example, in one specific embodiment, Main Sequence One (step 46 of FIG. 2) and Main Sequence Two (step 48 of FIG. 2) are very strict, but fewer functions (step 52 of FIG. 2) are executed, which would identify error conditions and, thus eliminate splits or possible phrases. In this embodiment, referred to as "strict," the parser is very strict about what can pass or succeed. In this case, the functions are somewhat relaxed and less readily eliminate splits or otherwise flag error conditions. The strict embodiment is faster than the "weak" embodiment, and is better suited for interactive dialogs where most grammar checking features are not required. In this strict embodiment, as presently illustrated in Main Sequence Two (FIG. 5), the subroutine Attach-Subcategories (step 156 of FIG. 5) is called immediately following the Evaluate-Verb subroutine (step 152). This causes early elimination of a phrase or sentence due to poor sentence structure, for example, in an incorrect sentence composed by non-native speaker of English. The subcategory requirements imposed by the subroutine Attach-Subcategories (step 156 of FIG. 5) are very rigid. Therefore the sentence must be in conformance with such rules in order to pass. For example, some functions. such as subject/verb agreement (FIG. 11, 430) are modified to flag sentences rather than reject them. Thus, if a speaker said "john like mary" in a strong version, the subject verb agreement function would reject the sentence, but in a weak version, the sentence would pass and would alert the user to the error.

In the embodiment, referred to as "weak," the parser is generous in what is permitted to pass though Main Sequence One and Main Sequence Two. For example, splits are not readily eliminated for minor infractions or violations of selected rules. In this case, the output of the parser is evaluated more throughly in the functions, as shown in step 52 of FIG. 2. The weak embodiment is slower than the strict embodiment but is better suited to grammar checking. In the weak embodiment, the subroutine Attach-Subcategories (step 156 of FIG. 5) is not called immediately following the Evaluate-Verb subroutine (step 152 of FIG. 5). Instead, the subroutine Attach-Subcategories is called after Main Sequence One and Main Sequence Two have been completed. In this weak embodiment, the subroutine Attach-Subcategories is called in the Main Overview Routine 40 (FIG. 2) after 50.

The basic difference between the "strict" and "weak" embodiments is manifested as a trade off between processing speed and the ability to recognize, describe, and analyze errors. In the weak embodiment, parsing is slower but it only fails sentences of the poorest construction. The weak embodiment does not lend itself to grammar checking. For example, a nonnative speaker of English might compose a sentence such as, "the student enjoy to read books" instead of the correct sentence "the student enjoys reading books." In the strict embodiment of the parser, the combination "enjoy to read" would be rejected in the preliminary stages of processing and the user would not have the benefit of an analysis of the remainder of the sentence. Therefore, the user would not be informed that the sentence also contained a subject/verb agreement error. This would be useful in tutorial environments. In the weak embodiment of the parser, the erroneous sentence would be allowed to pass. Subsequent functions (step 52 of FIG. 2) would be executed that would allow notification of both errors.

Of course, the absolute degree of strength and weakness may be varied depending upon the particular applications. This may be accomplished by implementing different aspects of analysis in Main Sequence One (step 46 of FIG. 2) and Main Sequence Two (step 48 of FIG. 2). Alternately, the strong and weak embodiments may be produced as separate versions.

However, not all aspects of the present inventive theory and method lend themselves to this form of variation. In particular, the Attachment/promotion portion necessarily must be part of Main Sequence One. To create the weaker embodiment of the parser described above, the subcategorizations of verbs, some selected minor algorithms, and some selection restrictions may be ignored until the time that the functions (FIG. 2, step 52) are executed, For example selected functions may be modified to flag errors rather than reject sentences. Further, very English-specific selection restrictions would not be used and a function may be included to flag those specific problems. For example, in English, one cannot properly write a sentence like "who what did John buy?" However, some nonnative speakers may not know that it is incorrect. Thus, the selection restriction that stipulates that a wh word cannot attach to a V0 that begins with a wh word, would be ignored, and a function would be included to identify such erroneous sentences.

Specific embodiments of a method and apparatus for universal parsing of language according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A computer implemented method for parsing words of an input string, the method comprising the steps of:
   a) retrieving the input string;
   b) performing a dictionary look-up for each word in the input string to form a correspondence between each word and a dictionary entry in the dictionary, said dictionary entry providing lexical features of the word;
   c) processing the words in the input string beginning with a last word in the input string and continuing toward the first word in the input string;
   d) said processing of the words in the input string including the steps of associating a selected word in the input string with a word located to the left of the selected word in the input string to form a word phrase, said associating performed according to predetermined selection restriction rules; and
   e) repeating steps (c) and (d), processing the words in the input string, until all words of the input string have been processed.

2. A computer implemented method for parsing words of an input string, the method comprising the steps of:
   a) retrieving the input string;
   b) performing a dictionary look-up for each word in the input string to form a correspondence between each word and a dictionary entry in the dictionary, said dictionary entry providing lexical features of the word;
   c) processing the words in the input string beginning with a last word in the input string and continuing toward the first word in the input string;
   said processing of the words in the input string including the steps of
   e) attaching a selected word in the input string to a preceding word in the input string, said attachment performed if permitted by at least one predetermined selection restriction rule and not performed if not permitted by at least one predetermined selection restriction rule, said attachment of the selected word to the preceding word forming a word phrase, said selection restriction rules based upon predetermined lexical features of the words in the input string;
   f) promoting at least one of the selected word and the word phrase in the input string to a next higher lexical value if permitted by at least one promotion restriction rule; and
   g) repeating the steps (c) through (f), including attaching and promoting, until all words of the input string have been processed.

3. A computer implemented method for parsing words of an input string, the method comprising the steps of:
   a) inputting the input string;
   b) performing a dictionary look-up for each word in the input string to form a correspondence between each word and a dictionary entry in the dictionary, said dictionary entries providing lexical features of the word;
   c) assigning a first level of strength to each word in the input string, said first level of strength defined by the dictionary entry corresponding the word and identifying a basic grammatical category associated with the word;
   d) selecting a word in the input string to process, said selected word corresponding to a last word of the input string;
   e) determining if the selected word attaches to an immediately preceding word in the input string, said determination performed according to predetermined selection restriction rules and resulting in one of a successful attachment and an attachment failure;
   f) said successful attachment resulting in formation of a word group linking the attached words, said word group assigned one of the first level of strength, a second level of strength, and a third level of strength, said levels of strength defined by the predetermined selection restriction rules;
   g) said attachment failure resulting in an attempt to promote the word group to a next higher level of strength, until the word group attains the third level of strength; and
   h) selecting the next word in the input string located to the left of the selected word and performing steps (e) through (g) until all words in the input string have been processed.

* * * * *